US012092506B2

(12) United States Patent
Lance et al.

(10) Patent No.: US 12,092,506 B2
(45) Date of Patent: Sep. 17, 2024

(54) SUMP PUMP SYSTEM, INCLUDING WATER LEVEL SENSOR SHIELD

(71) Applicant: Fortune Brands Water Innovations LLC, North Olmsted, OH (US)

(72) Inventors: Matthew J. Lance, North Ridgeville, OH (US); Yaakov Korb, Grafton, OH (US)

(73) Assignee: Fortune Brands Water Innovations LLC, North Olmsted, OH (US)

( * ) Notice: Subject to any disclaimer, the term of this patent is extended or adjusted under 35 U.S.C. 154(b) by 248 days.

(21) Appl. No.: 17/866,090

(22) Filed: Jul. 15, 2022

(65) Prior Publication Data

US 2023/0014325 A1    Jan. 19, 2023

Related U.S. Application Data

(60) Provisional application No. 63/255,238, filed on Oct. 13, 2021, provisional application No. 63/221,987, filed on Jul. 15, 2021.

(51) Int. Cl.
*G01F 23/292* (2006.01)
*F04B 49/06* (2006.01)

(52) U.S. Cl.
CPC .......... *G01F 23/292* (2013.01); *F04B 49/065* (2013.01)

(58) Field of Classification Search
CPC .. F04D 15/0218; F04D 15/0072; F04B 49/06; G01F 23/292
See application file for complete search history.

(56) References Cited

U.S. PATENT DOCUMENTS

| 4,369,438 A | 1/1983 | Wilhelmi |
| 4,396,353 A | 1/1983 | Duenke |
| 4,808,865 A | 2/1989 | King |
| 5,071,370 A | 12/1991 | Kochan, Jr. |
| 5,672,050 A | 9/1997 | Webber et al. |
| 5,919,706 A | 7/1999 | Tajima |
| 6,276,901 B1 | 8/2001 | Farr et al. |
| 6,356,467 B1 | 3/2002 | Belehradek, Jr. |

(Continued)

FOREIGN PATENT DOCUMENTS

| CA | 2838904 A1 | 12/2017 |
| CN | 212254265 U | * 12/2020 |

(Continued)

OTHER PUBLICATIONS

International Search Report for International App. No. PCT/US2022/037327 dated Oct. 28, 2022 (2 pages).

(Continued)

*Primary Examiner* — Maurice C Smith
(74) *Attorney, Agent, or Firm* — Calfee, Halter & Griswold LLP

(57) ABSTRACT

The present invention provides a sump pump system, including a sump pump monitor and application. The sump pump system includes a sump pump. Components of the sump pump system are installed in and/or near a sump. The sump collects liquid, such as water, from an inlet pipe. The sump pump is operable to remove water from the sump. The sump pump is fluidly connected to a discharge pipe. The discharge pipe is operable to carry water from the sump pump to a storm sewer or other discharge point.

20 Claims, 19 Drawing Sheets

(56) References Cited

U.S. PATENT DOCUMENTS

| | | |
|---|---|---|
| 6,364,620 B1 | 4/2002 | Fletcher et al. |
| 6,366,053 B1 | 4/2002 | Belehradek |
| 6,375,430 B1 | 4/2002 | Eckert et al. |
| 6,430,757 B1 | 8/2002 | Pohler |
| 6,443,715 B1 | 9/2002 | Mayleben et al. |
| 6,464,531 B2 | 10/2002 | Eckert et al. |
| 6,640,196 B1 | 10/2003 | Unsworth et al. |
| 6,649,839 B2 | 11/2003 | Eckert et al. |
| 6,676,382 B2 | 1/2004 | Leighton et al. |
| 6,741,442 B1 | 5/2004 | McNally et al. |
| 6,758,051 B2 | 7/2004 | Jayanth et al. |
| D500,770 S | 1/2005 | Pohler |
| 7,145,467 B2 | 12/2006 | Abel et al. |
| 7,309,216 B1 | 12/2007 | Spadola, Jr. et al. |
| 7,520,736 B2 | 4/2009 | Pohler |
| 7,537,439 B2 | 5/2009 | Pohler |
| 7,563,082 B2 | 7/2009 | Pohler |
| 7,615,954 B1 | 11/2009 | Potter et al. |
| 7,768,414 B2 | 8/2010 | Abel et al. |
| 7,843,081 B2 | 11/2010 | Lim |
| 8,149,122 B2 | 4/2012 | Burza |
| 8,226,371 B2 | 7/2012 | Kochan |
| 8,297,937 B2 | 10/2012 | Johnson |
| 8,380,355 B2 | 2/2013 | Mayleben et al. |
| 8,409,124 B2 | 4/2013 | Steffens et al. |
| 8,500,412 B2 | 8/2013 | Williams et al. |
| 8,523,532 B1 | 9/2013 | Pohler |
| 8,535,014 B2 | 9/2013 | Burch, Jr. et al. |
| 8,562,287 B2 | 10/2013 | Schmidt et al. |
| 8,774,972 B2 | 7/2014 | Rusnak et al. |
| 8,888,465 B1 | 11/2014 | Pohler |
| 8,907,789 B2 | 12/2014 | Kochan, Jr. et al. |
| 9,074,587 B2 | 7/2015 | Atchia |
| D740,329 S | 10/2015 | Gilbert et al. |
| D740,698 S | 10/2015 | Cummings |
| D741,815 S | 10/2015 | Cummings |
| 9,157,434 B2 | 10/2015 | Leonard et al. |
| 9,383,244 B2 | 7/2016 | Bishop et al. |
| 9,404,501 B2 | 8/2016 | Cummings |
| 9,441,632 B2 | 9/2016 | Bishop et al. |
| 9,500,193 B2 | 11/2016 | Knight et al. |
| 9,500,194 B2 | 11/2016 | Knight et al. |
| 9,523,366 B2 | 12/2016 | Cummings et al. |
| 9,525,309 B2 | 12/2016 | Cummings |
| 9,528,512 B2 | 12/2016 | Cummings |
| 9,528,520 B2 | 12/2016 | Cummings |
| 9,528,522 B2 | 12/2016 | Cummings |
| 9,528,523 B2 | 12/2016 | Cummings |
| 9,528,873 B2 | 12/2016 | Cummings |
| 9,534,593 B2 | 1/2017 | Cummings et al. |
| 9,534,606 B2 | 1/2017 | Cummings |
| 9,696,360 B2 | 7/2017 | Rothbart |
| 9,709,054 B2 | 7/2017 | Cummings |
| 9,920,766 B2 | 3/2018 | Bishop et al. |
| 9,927,479 B2 | 3/2018 | Rothbart |
| 9,958,878 B2 | 5/2018 | Kochan, Jr. et al. |
| 9,989,397 B1 | 6/2018 | Kinney et al. |
| 10,082,268 B2 | 9/2018 | Peterson et al. |
| 10,162,369 B2 | 12/2018 | McCrossen et al. |
| 10,208,747 B2 | 2/2019 | Cummings |
| 10,233,940 B2 | 3/2019 | Pohler |
| 10,711,788 B2 | 7/2020 | Mayleben |
| 11,041,908 B2 | 6/2021 | Rothbart |
| 2003/0049134 A1 | 3/2003 | Leighton et al. |
| 2003/0115890 A1 | 6/2003 | Jayanth et al. |
| 2005/0232796 A1 | 10/2005 | Pohler |
| 2006/0072269 A1 | 4/2006 | Staples |
| 2006/0228222 A1 | 10/2006 | Pohler |
| 2007/0144564 A1 | 6/2007 | Gadini et al. |
| 2008/0031751 A1 | 2/2008 | Littwin et al. |
| 2009/0185914 A1 | 7/2009 | Elnar |
| 2009/0317259 A1 | 12/2009 | Burch, Jr. et al. |
| 2010/0135823 A1 | 6/2010 | Andy |
| 2010/0319116 A1 | 12/2010 | Schmidt et al. |
| 2011/0085919 A1 | 4/2011 | Williams et al. |
| 2011/0311370 A1 | 12/2011 | Sloss et al. |
| 2013/0201316 A1 | 8/2013 | Binder et al. |
| 2014/0202243 A1 | 7/2014 | Leonard et al. |
| 2015/0002658 A1 | 1/2015 | Jaw et al. |
| 2015/0143892 A1 | 5/2015 | Cummings |
| 2017/0114790 A1 | 4/2017 | Pohler |
| 2018/0010762 A1 | 1/2018 | Peterson et al. |
| 2018/0011498 A1 | 1/2018 | McCrossen et al. |
| 2018/0163730 A1 | 6/2018 | Wilds et al. |
| 2018/0196097 A1 | 7/2018 | Rothbart |
| 2018/0291911 A1* | 10/2018 | Ward ............... F04F 5/10 |
| 2019/0331252 A1* | 10/2019 | Jensen ............. G05D 9/12 |
| 2020/0003217 A1 | 1/2020 | Wilds |
| 2020/0040915 A1 | 2/2020 | Pohler et al. |
| 2020/0180937 A1* | 6/2020 | Frith ............... G01S 17/08 |
| 2020/0209092 A1 | 7/2020 | Banta |

FOREIGN PATENT DOCUMENTS

| | | | |
|---|---|---|---|
| WO | WO-2018199486 A1 * | 11/2018 | ......... A47L 15/4223 |
| WO | WO-2019187564 A1 * | 10/2019 | |

OTHER PUBLICATIONS

Written Opinion of the International Searching Authority of International App. No. PCT/US2022/037327 dated Oct. 28, 2022 (8 pages).

International Search Report for International App. No. PCT/US2022/037334 dated Dec. 15, 2022 (4 pages).

Written Opinion of the International Searching Authority of International App. No. PCT/US2022/037334 dated Dec. 15, 2022 (6 pages).

Author unknown, Allegro Microsystems ACS716 120 KHz Bandwidth, High-Voltage Isolation Current Sensor with Integrated Overcurrent Detection Product Materials, at least a version of the product shown in the Product Materials is believed to have been publicly available prior to Jul. 15, 2021 (23 pages).

Paul Lamkin, Ambient Article re Best smart home hubs 2022: Do more by picking the perfect hub (available at https://web.archive.org/web/20220612215747/www.the-ambient.com/buyers-guides/best-smart-home-hubs-2599—retrieved on Jul. 12, 2023), the Ambient Article is believed to have been publicly available prior to Jul. 15, 2022 (19 pages).

Author unknown, The Basement Watchdog Connect WiFi Module Instruction Manual, at least a version of the product shown in the Instruction Manual is believed to have been publicly available prior to Jul. 15, 2021 (10 pages).

Author unknown, Beacon ProAct 200 System Installation Guide, at least a version of the product shown in the Installation Guide is believed to have been publicly available prior to Jul. 15, 2021 (20 pages).

Author unknown, Hydropump RH1400 Battery Powered Backup Sump Product Materials, at least a version of the product shown in the Product Materials is believed to have been publicly available prior to Jul. 15, 2021 (4 pages).

Author unknown, Ion Genesis II Pump Controller Operation Manual, at least a version of the product shown in the Operation Manual is believed to have been publicly available prior to Jul. 15, 2021 (8 pages).

Author unknown, Level Sense Pro User Manual, at least a version of the product shown in the User Manual is believed to have been publicly available prior to Jul. 15, 2021 (24 pages).

Author unknown, Liberty Pumps ALM-Series Indoor Alarms Installation Manual, at least a version of the product shown in the Installation Manual is believed to have been publicly available prior to Jul. 15, 2021 (6 pages).

Author unknown, Liberty Pumps 442 Series Battery Backup System Installation Manual, at least a version of the product shown in the Installation Manual is believed to have been publicly available prior to Jul. 15, 2021 (12 pages).

Author unknown, Liberty Pumps SumpJet Water Powered Backup System Installation Manual, at least a version of the product shown

(56) References Cited

OTHER PUBLICATIONS in the Installation Manual is believed to have been publicly available prior to Jul. 15, 2021 (8 pages).
Rachel Murphy, This Smart Sump Pump Monitor Can Prevent Water Leaks Article, Moen's new sump pump monitoring system alerts you before potential water damage occurs (available at https://reviewed.usatoday.com/smarthome/features/moen-smart-sump-pump-monitor-ces—retrieved on Jul. 12, 2023), the product shown in the Article was publicly available prior to Jul. 15, 2021 (3 pages).
Author unknown, NexPump Ai Manual, at least a version of the product shown in the Manual is believed to have been publicly available prior to Jul. 15, 2021 (26 pages).
Author unknown, NexPump Installation Guide, at least a version of the product shown in the Installation Guide is believed to have been publicly available prior to Jul. 15, 2021 (2 pages).
Author unknown, Pro Series Pumps 2400 Battery Backup Sump Pump System Product Materials, at least a version of the product shown in the Product Materials is believed to have been publicly available prior to Jul. 15, 2021 (2 pages).
Author unknown, Pro Series Pumps WiFi Module Instruction Manual, at least a version of the product shown in the Instruction Manual is believed to have been publicly available prior to Jul. 15, 2021 (12 pages).
Author unknown, Proteus PRO User Guide, at least a version of the product shown in the User Guide is believed to have been publicly available prior to Jul. 15, 2021 (20 pages).
Author unknown, Proteus How to Install Electric Load Sensor Installation Materials, at least a version of the product shown in the Installation Materials is believed to have been publicly available prior to Jul. 15, 2021 (5 pages).
Author unknown, Proteus How to Install Laser Level Sensor Installation Materials, at least a version of the product shown in the Installation Materials is believed to have been publicly available prior to Jul. 15, 2021 (3 pages).
Author unknown, Proteus How to Install Water Level Sensor Installation Materials, at least a version of the product shown in the Installation Materials is believed to have been publicly available prior to Jul. 15, 2021 (4 pages).
Author unknown, PumpSpy WiFi Connected Battery Backup Sump Pump & Monitoring System Installation and Operating Instructions, at least a version of the product shown in the Installation and Operating Instructions is believed to have been publicly available prior to Jul. 15, 2021 (8 pages).
Author unknown, PumpSpy Sump Pump Smart Outlet Specifications and Installation Materials, at least a version of the product shown in the Specifications and Installation Materials is believed to have been publicly available prior to Jul. 15, 2021 (2 pages).
Author unknown, STMicroelectronics VL53LOX Time-of-Flight ranging sensor Datasheet, at least a version of the product shown in the Datasheet is believed to have been publicly available prior to Jul. 15, 2021 (38 pages).
Author unknown, STMicroelectronics VL53LOX ranging module cover window guidelines AN4907 Application note, at least a version of the product shown in the Application note is believed to have been publicly available prior to Jul. 15, 2021 (21 pages).
Author unknown, Wayne Basement Guardian Wi-Fi Module Quick Start Guide, at least a version of the product shown in the Quick Start Guide is believed to have been publicly available prior to Jul. 15, 2021 (12 pages).
Author unknown, WiOn Smart Wifi Plug Installation Instructions (available at https://www.wionconnect.com/wion-50055-setup/—retrieved on Aug. 29, 2023), at least a version of the product shown in the Installation Instructions is believed to have been publicly available prior to Jul. 15, 2021 (6 pages).
Author unknown, Zoeller Pump Company APak Alarm Installation Instructions, at least a version of the product shown in the Installation Instructions is believed to have been publicly available prior to Jul. 15, 2021 (24 pages).
Author unknown, Zoeller Pump Company APak Indoor Alarm Technical Data Sheet, at least a version of the product shown in the Technical Data Sheet is believed to have been publicly available prior to Jul. 15, 2021 (2 pages).
Author unknown, Zoeller Pump Company AquaNot Fit 508 Installation Instructions, at least a version of the product shown in the Installation Instructions is believed to have been publicly available prior to Jul. 15, 2021 (12 pages).
Author unknown, Zoeller Pump Company AquaNot Fit 508 Technical Data Sheet, at least a version of the product shown in the Technical Data Sheet is believed to have been publicly available prior to Jul. 15, 2021 (2 pages).

* cited by examiner

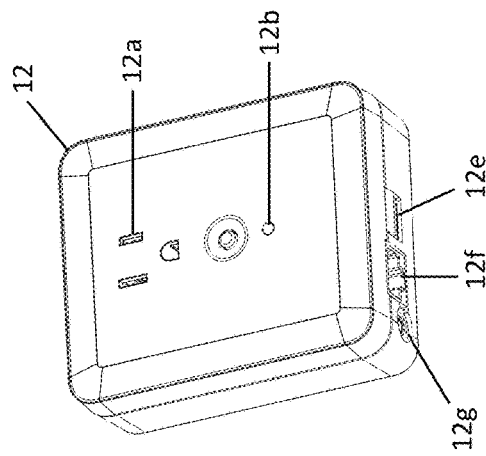
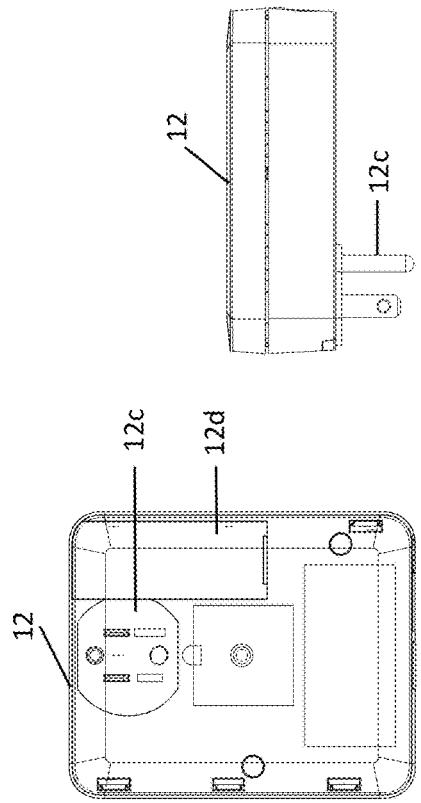
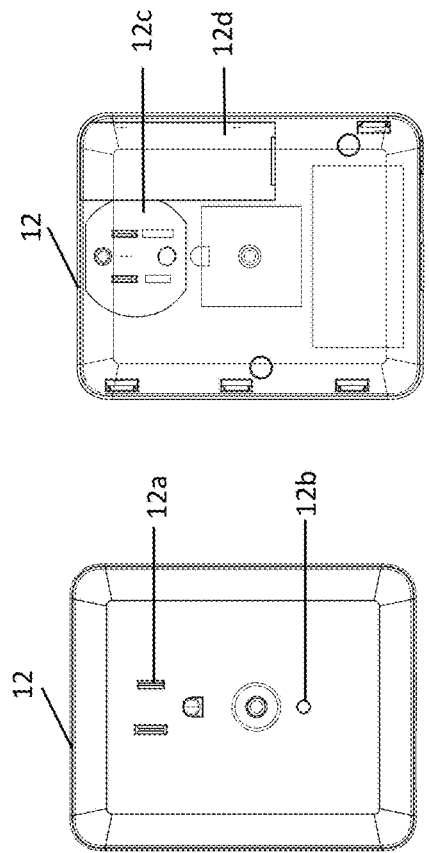
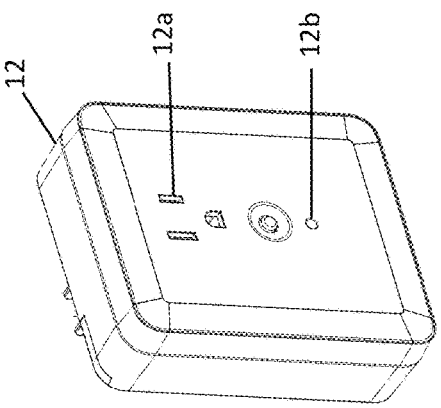

SUMP PUMP SYSTEM, INCLUDING WATER LEVEL SENSOR SHIELD

CROSS-REFERENCE TO RELATED APPLICATIONS

This application claims the benefit of U.S. Provisional Application No. 63/221,987, filed Jul. 15, 2021, and U.S. Provisional Application No. 63/255,238, filed Oct. 13, 2021, the entire disclosures of which are hereby incorporated by reference.

FIELD

The present invention relates generally to a sump pump system and, more particularly, to a sump pump system including a water level sensor shield.

BACKGROUND

Sump pumps are well known. Sump pumps are used to remove water from basements and crawl spaces of buildings. The sump pump is at least partially installed in a sump or a sump crock. When water reaches a predetermined level in the sump or the sump crock, the sump pump is activated and removes water from the sump or the sump crock. Users desire reliable sump pumps. Many difficulties can be encountered in providing reliable sump pumps.

SUMMARY

The present invention provides a sump pump system, including a water level sensor shield.

In an exemplary embodiment, the water level sensor assembly for a sump pump system comprises a water level sensor and a housing. The water level sensor is operable to detect a level of water in a sump. The water level sensor includes a transmitter and a receiver. The transmitter is operable to emit light. The receiver is operable to receive light. The transmitter has a transmitter exclusion zone extending from the transmitter. The receiver has a receiver exclusion zone extending from the receiver. The housing includes an upper portion and a lower portion. The upper portion is operable to receive the water level sensor. The lower portion has an upper end and a lower end. The upper end includes an upper opening. The lower end includes a lower opening. The upper opening is smaller than the lower opening.

In an exemplary embodiment, the water level sensor assembly for a sump pump system comprises a water level sensor and a housing. The water level sensor is operable to detect a level of water in a sump. The water level sensor includes a transmitter and a receiver. The transmitter is operable to emit light. The receiver is operable to receive light. The transmitter has a transmitter exclusion zone extending from the transmitter. The receiver has a receiver exclusion zone extending from the receiver. The housing includes an upper portion and a lower portion. The upper portion is operable to receive the water level sensor, a seal, and a lens. The lower portion has an upper end and a lower end. The upper end includes an upper opening. The lower end includes a lower opening. The upper opening is smaller than the lower opening. The seal is operable to seat against the upper end of the lower portion.

In an exemplary embodiment, the water level sensor assembly for a sump pump system comprises a water level sensor and a housing. The water level sensor is operable to detect a level of water in a sump. The water level sensor includes a transmitter and a receiver. The transmitter is operable to emit light. The receiver is operable to receive light. The transmitter has a transmitter exclusion zone extending from the transmitter. The receiver has a receiver exclusion zone extending from the receiver. The housing includes an upper portion and a lower portion. The upper portion is operable to receive the water level sensor. The lower portion has an upper end and a lower end. The upper end includes an upper opening. The lower end includes a lower opening. The upper opening is smaller than the lower opening. The lower portion has an inner surface. The inner surface of the lower portion of the housing intersects at least one of the transmitter exclusion zone and the receiver exclusion zone.

BRIEF DESCRIPTION OF THE DRAWINGS

FIGS. 10a-10e are views of the sump pump monitor of FIG. 9-FIG. 10a is a front-top perspective view, FIG. 10b is a front-bottom perspective view, FIG. 10c is a front view, FIG. 10d is a rear view, and FIG. 10e is a left side view;

-FIG. 15a is a top perspective view, FIG. 15b is an exploded perspective view, and FIG. 15c is an exploded side view; -FIG. 16a is a bottom perspective view, FIG. 16b is a top perspective view, FIG. 16c is a side view, FIG. 16d is another side view, and FIG. 16e is a longitudinal cross-sectional view.

DETAILED DESCRIPTION

The present invention provides a sump pump system, including a water level sensor shield.

Figure 1:
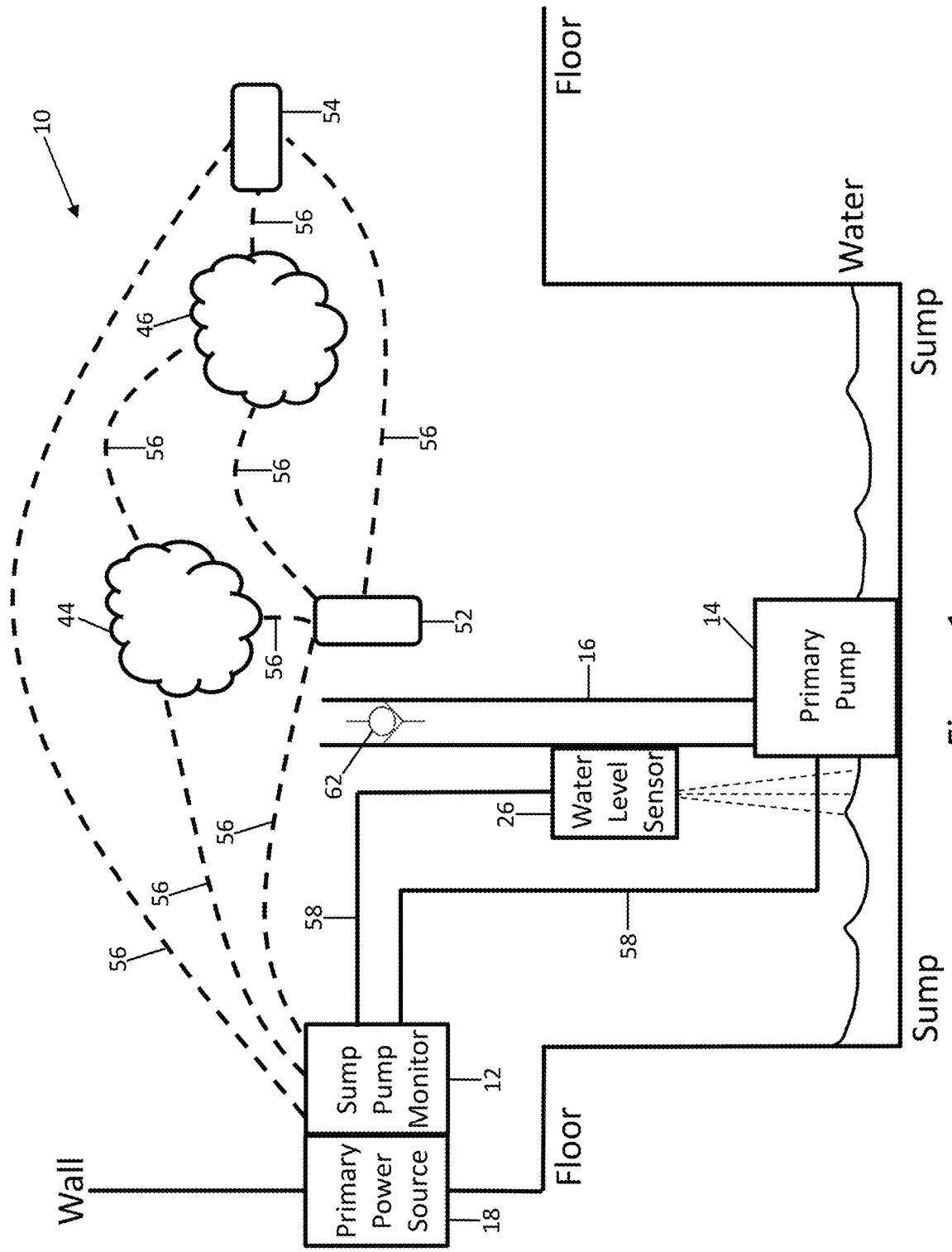
FIG. 1 is a schematic illustration of a sump pump system, including a primary pump and a sump pump monitor, according to an exemplary embodiment of the present invention.
Figure 2:
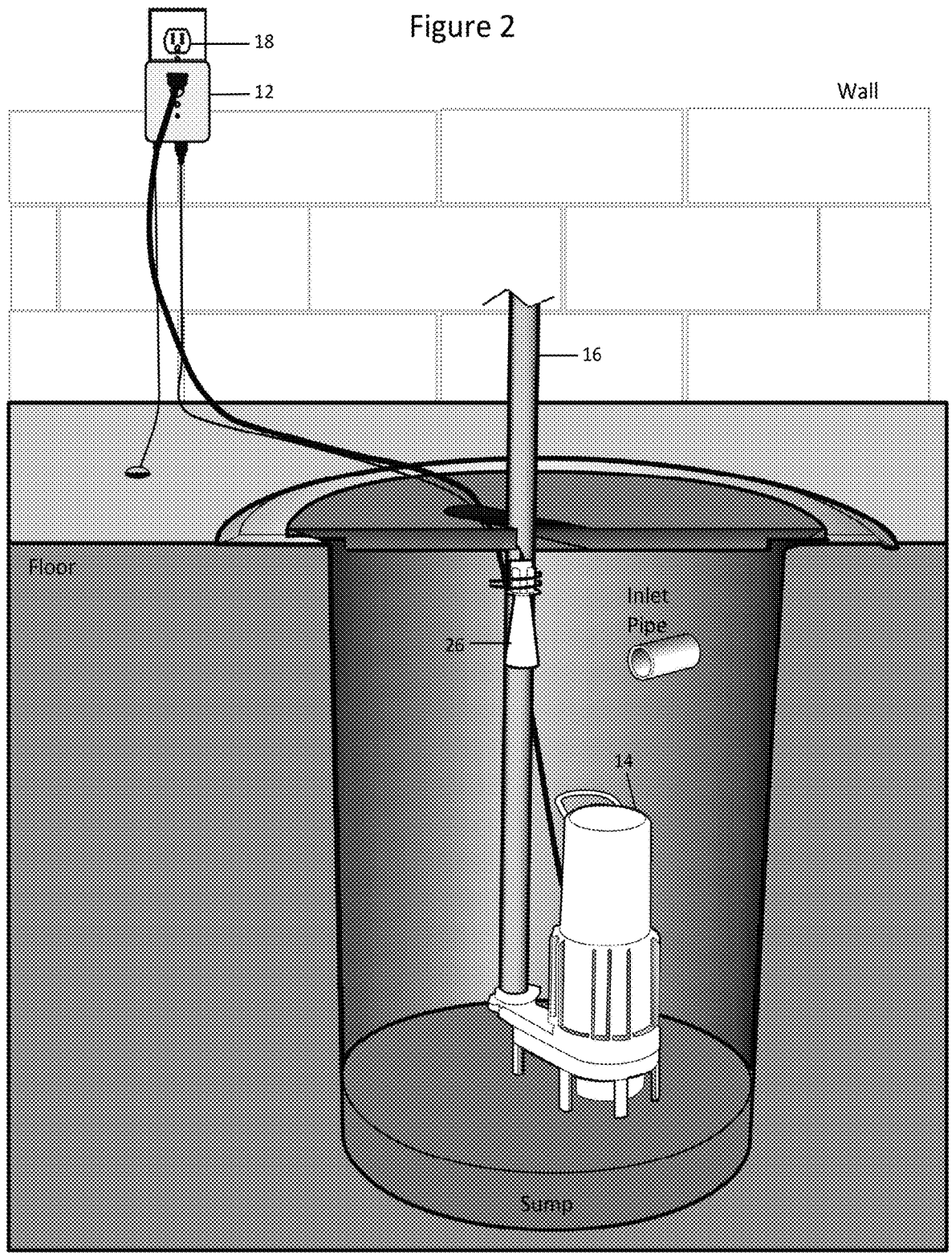
FIG. 2 is an illustration of a sump pump system, including a primary pump and a sump pump monitor, according to an exemplary embodiment of the present invention.
Figure 3:
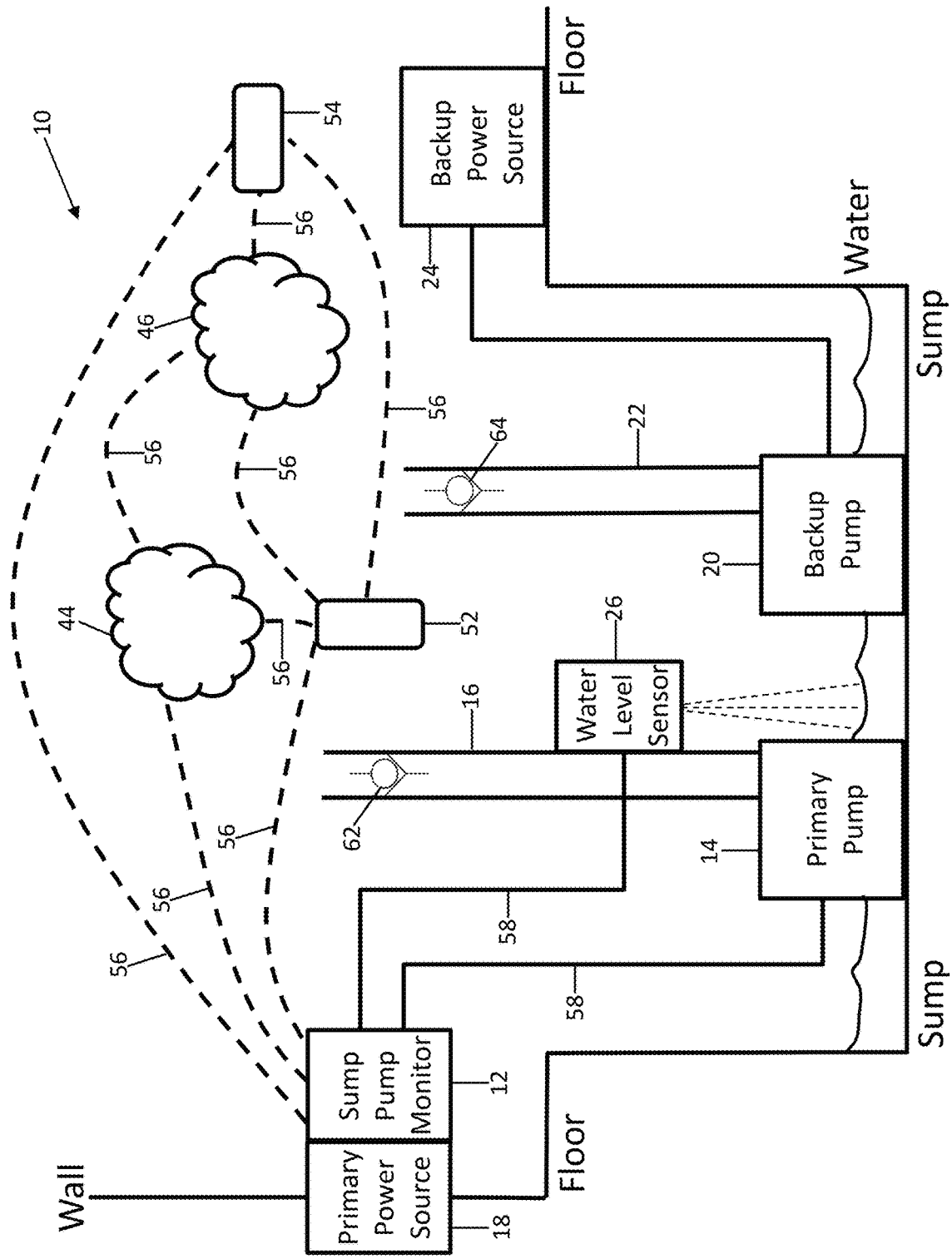
FIG. 3 is a schematic illustration of a sump pump system, including a primary pump, a backup pump, and a sump pump monitor, according to an exemplary embodiment of the present invention.
Figure 4:
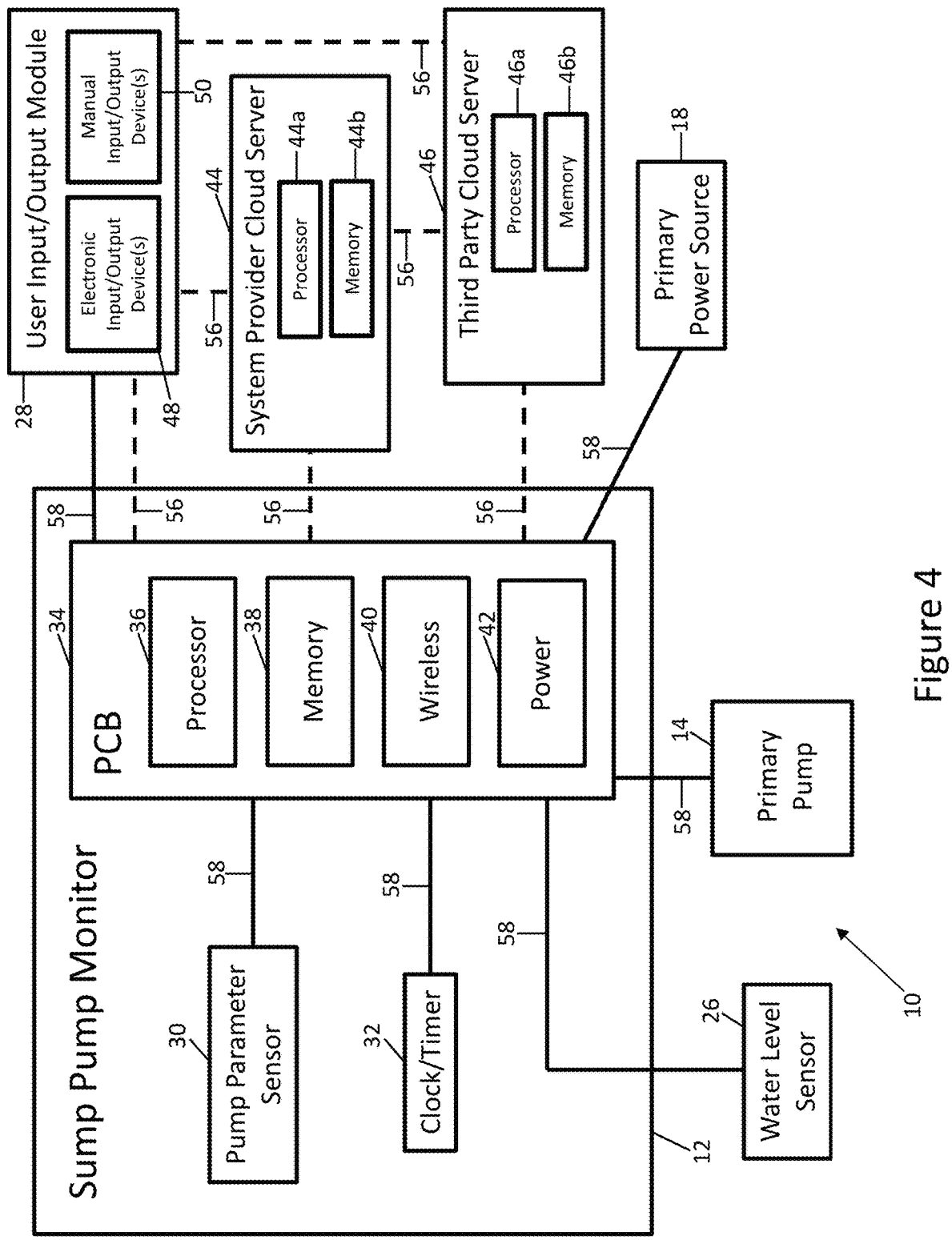
FIG. 4 is another schematic illustration of the sump pump system, including the primary pump and the sump pump monitor, of FIG. 1.
Figure 5:
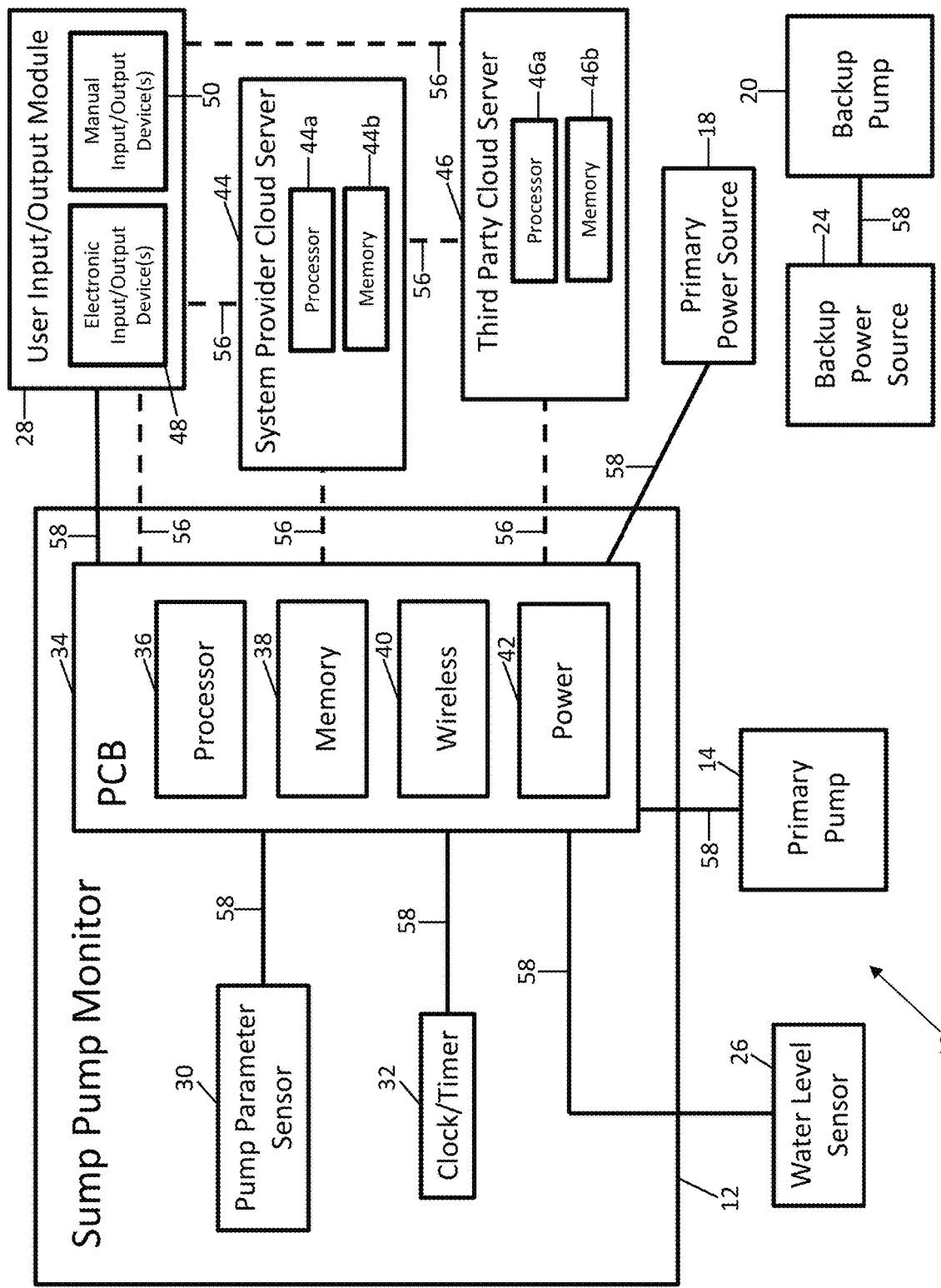
FIG. 5 is another schematic illustration of the sump pump system, including the primary pump, the backup pump, and the sump pump monitor, of FIG. 3.
Figure 6:
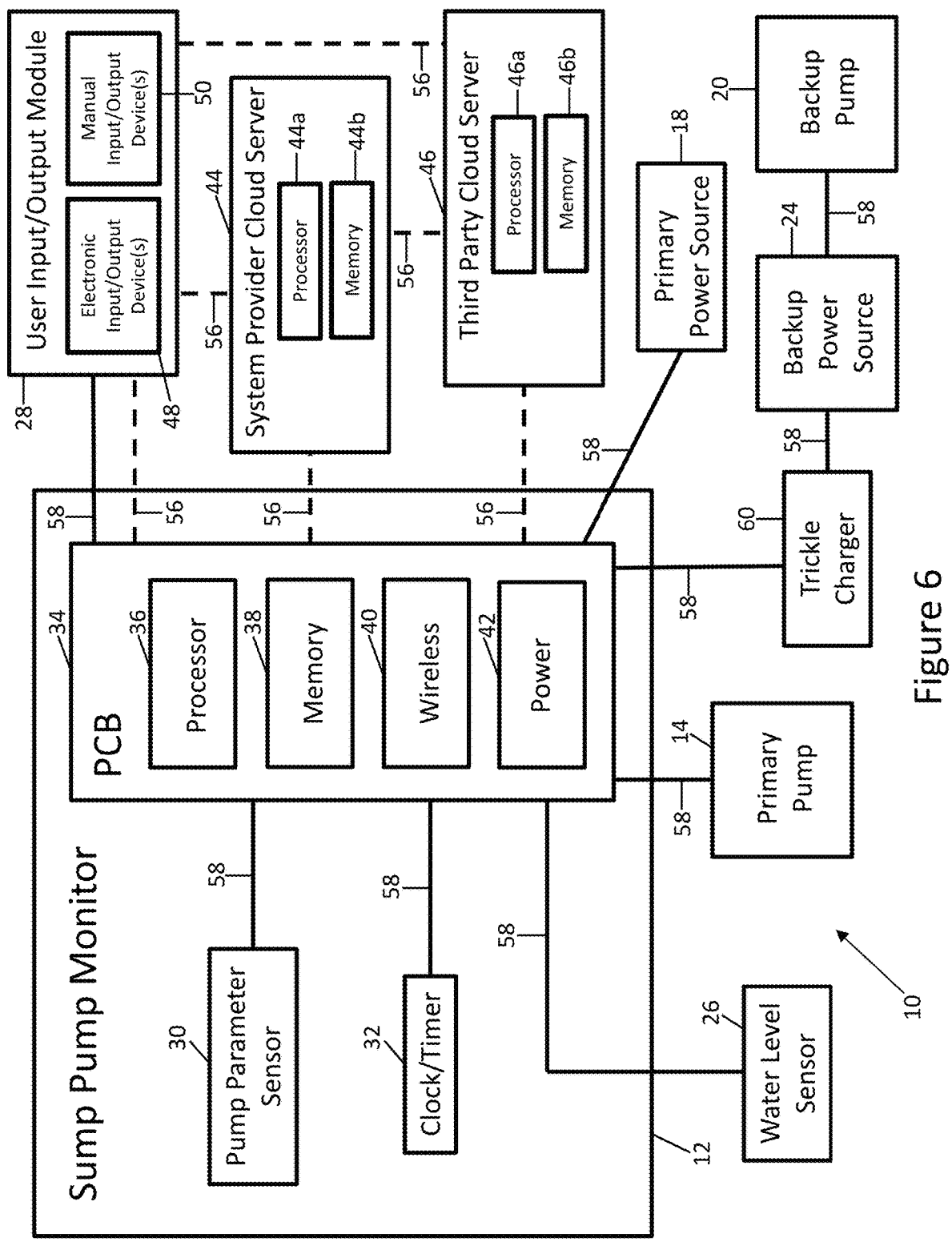
FIG. 6 is another schematic illustration of the sump pump system, including the primary pump, the backup pump, and the sump pump monitor, of FIG. 3, and further including a trickle charger.

Exemplary embodiments of a sump pump system 10, including a sump pump monitor 12, are illustrated in FIGS. 1-6. FIGS. 1-3 show fluidic and electrical/electronic components and connections of the sump pump system 10, and FIGS. 4-6 show electrical/electronic components and connections of the sump pump system 10.

In exemplary embodiments, the sump pump system 10 includes a sump pump. Components of the sump pump system 10 are installed in and/or near a sump or a sump crock. A sump is a reservoir in a basement or a crawl space of a building. A sump crock is a receptacle that is sometimes placed in the sump. For ease of reference, the term sump will be used herein, regardless of whether a sump crock is placed in the sump. The sump collects liquid, such as water, from an inlet pipe. The sump pump is operable to remove water from the sump. The sump pump is fluidly connected to a discharge pipe. The discharge pipe is operable to carry water from the sump pump to a storm sewer or other discharge point.

In the illustrated embodiments, as shown in FIGS. 1-6, the sump pump system 10 includes a primary pump 14. The primary pump 14 is operable to remove water from the sump. The primary pump 14 is fluidly connected to a primary discharge pipe 16. Normally, the primary pump 14 operates when a water level in the sump reaches a primary activation threshold level. Typically, the primary pump 14 includes a primary float and a primary switch (not separately shown). When the primary float determines that the water level has reached the primary activation threshold level, the primary float triggers the primary switch, which in turn activates the primary pump 14. The primary pump 14 operates and removes water from the sump through the primary discharge pipe 16. When the primary float determines that the water level has reached a primary deactivation threshold level, the primary float triggers the primary switch, which in turn deactivates the primary pump 14. The primary pump 14 is electrically connected to a primary power source 18. In an exemplary embodiment, the primary pump 14 is AC powered, so the primary power source 18 is an AC outlet. Primary pumps and primary power sources are well known in the art and will not be described in greater detail.

In the illustrated embodiments, as shown in FIGS. 3, 5, and 6, the sump pump system 10 further includes a backup pump 20. The backup pump 20 is operable to remove water from the sump. The backup pump 20 is fluidly connected to a backup discharge pipe 22. Normally, the backup pump 20 operates when the primary pump 14 is having difficulty maintaining the water level in the sump or has failed. Typically, the backup pump 20 includes a backup float and a backup switch (not separately shown). When the backup float determines that the water level has reached a backup activation threshold level (which is greater than the primary activation threshold level), the backup float triggers the backup switch, which in turn activates the backup pump 20. The backup pump 20 operates and removes water from the sump through the backup discharge pipe 22. When the backup float determines that the water level has reached the backup deactivation threshold level, the backup float triggers the backup switch, which in turn deactivates the backup pump 20. In an exemplary embodiment, the backup pump 20 is electrically connected to a backup power source 24. However, one of ordinary skill in the art will appreciate that the backup pump 20 could be electrically connected to the primary power source 18. In an exemplary embodiment, the backup pump 20 is battery powered, so the backup power source 24 is a battery. Backup pumps and backup power sources are well known in the art and will not be described in greater detail.

When reference is made to one component of the sump pump system 10 connecting to another component of the sump pump system 10, the connection may be direct or indirect. One of ordinary skill in the art will appreciate that additional components may be needed if the connection is indirect.

Figure 7:
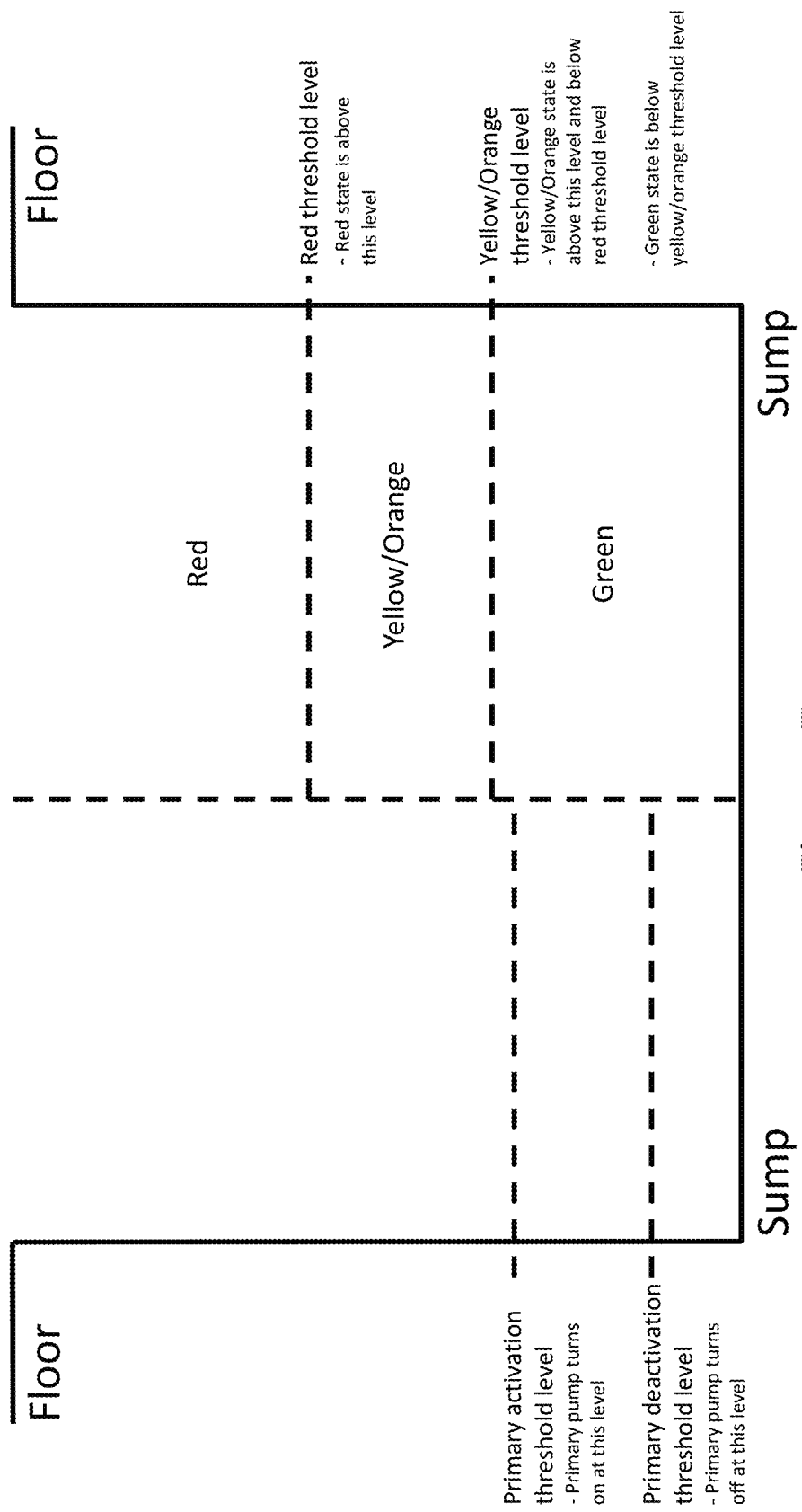
FIG. 7 is a schematic illustration of exemplary threshold water levels in the sump pump systems of FIGS. 1, 2, and 4.
Figure 8:
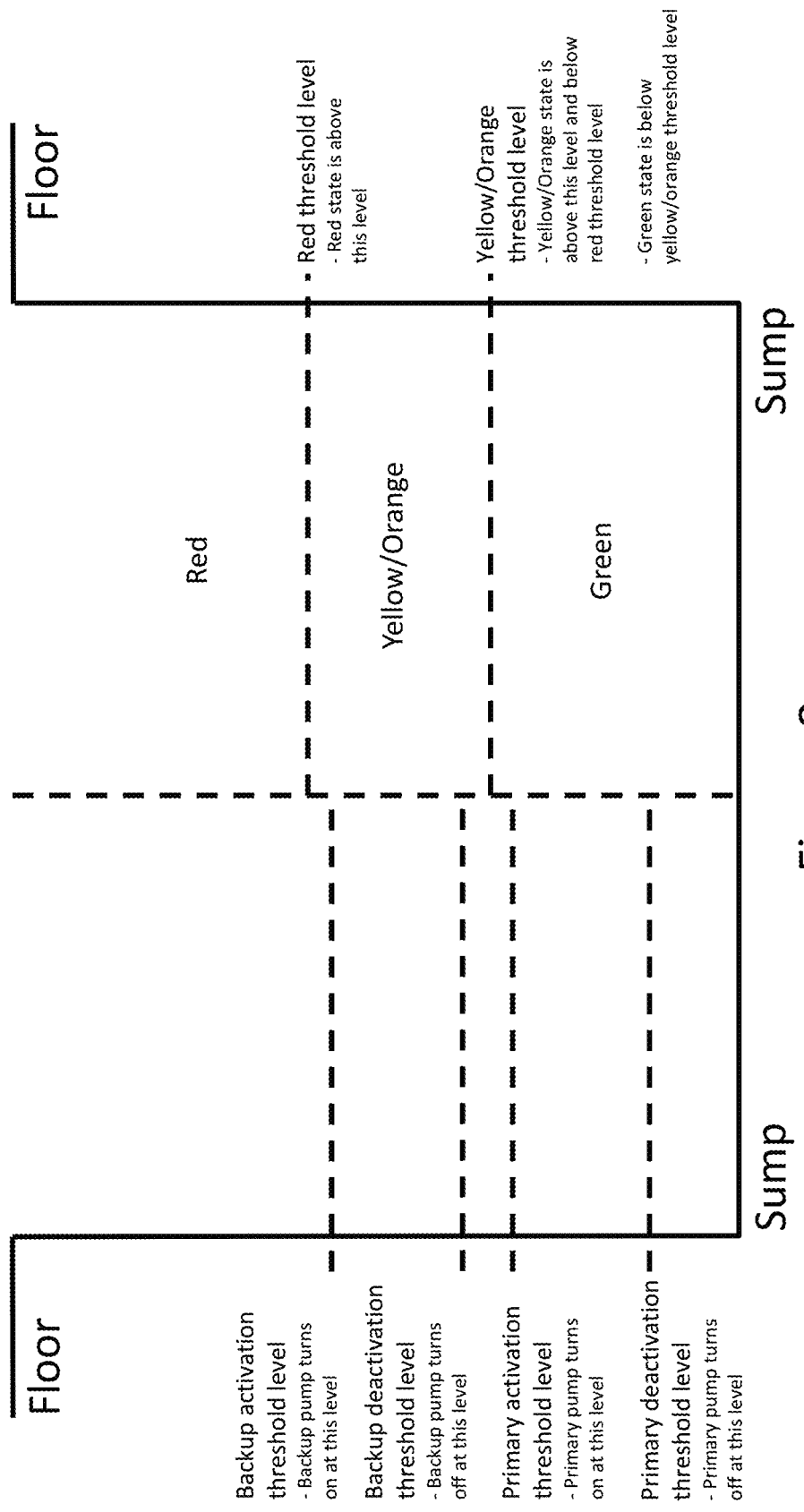
FIG. 8 is a schematic illustration of exemplary threshold water levels in the sump pump system of FIGS. 3, 5, and 6.
Figure 9:
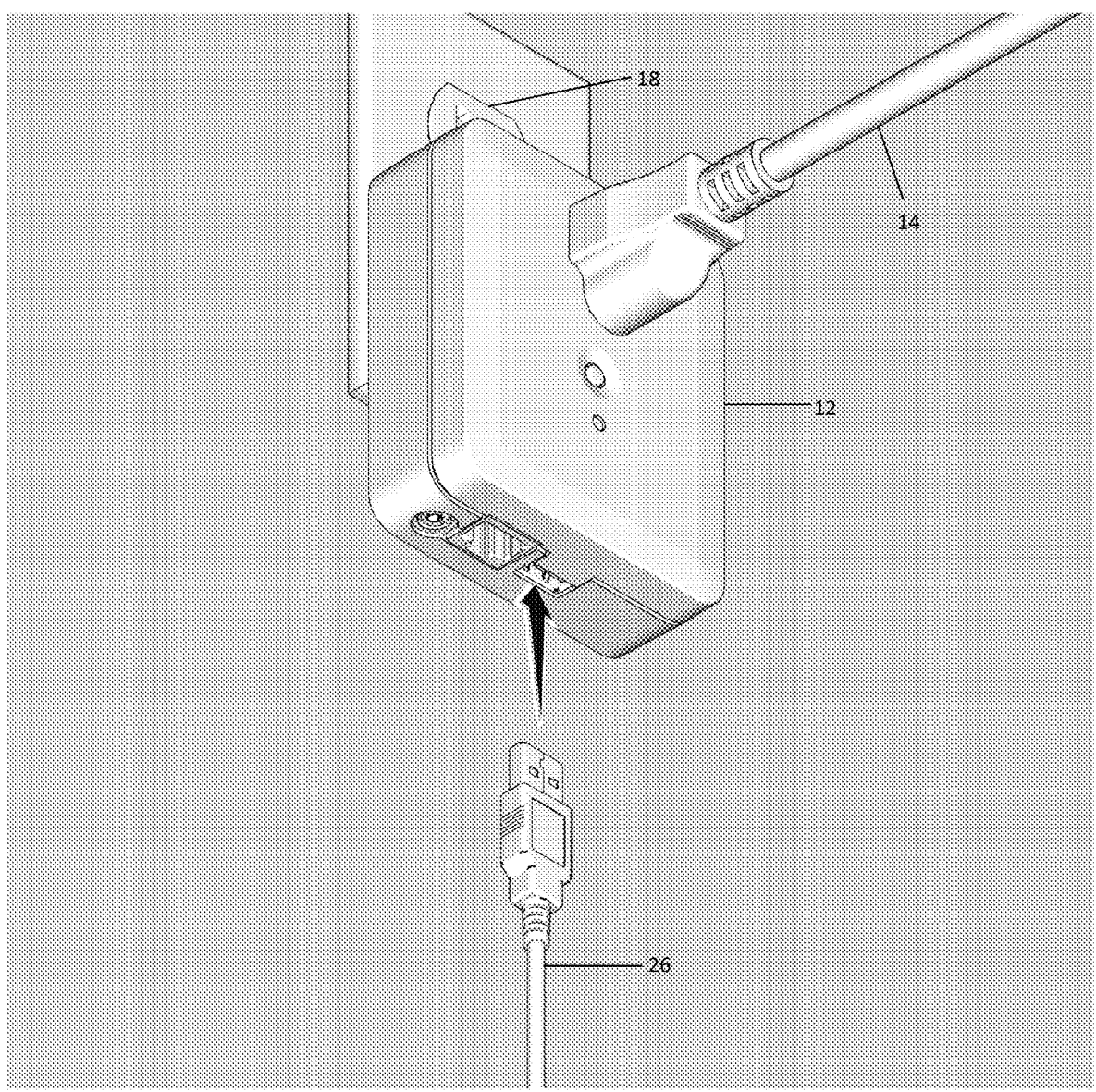
FIG. 9 is an illustration of an exemplary embodiment of the sump pump monitor of FIGS. 1-6.

In the illustrated embodiments, as shown in FIGS. 7 and 8 and discussed above, when the water level in the sump reaches various threshold levels, operation (i.e., activation and deactivation) of the primary pump 14 and/or the backup pump 20 is triggered. Exemplary threshold levels include: (1) the primary activation threshold level, (2) the primary deactivation threshold level, (3) the backup activation threshold level, and/or (4) the backup deactivation threshold level. The primary activation threshold level is a level of water in the sump at which the primary pump 14 activates. The primary deactivation threshold level is a level of water in the sump at which the primary pump 14 deactivates. The primary activation threshold level is greater than the primary deactivation threshold level. The backup activation threshold level is a level of water in the sump at which the backup pump 20 activates. The backup deactivation level is a level of water in the sump at which the backup pump 20 deactivates. The backup activation threshold level is greater than the backup deactivation threshold level. In an exemplary embodiment, the backup activation threshold level is greater than the primary activation threshold level. In an exemplary embodiment, the backup deactivation threshold level is greater than the primary deactivation threshold level. In an exemplary embodiment, the backup deactivation threshold level is greater than the primary activation threshold level.

In the illustrated embodiments, as shown in FIGS. 7 and 8, when the water level in the sump reaches various threshold levels, the water level is assigned a state. Exemplary threshold levels include: (1) a yellow/orange threshold level, and (2) a red threshold level. Exemplary states include: (1) green, (2) yellow/orange, and (3) red. In exemplary embodiments, the yellow/orange threshold level is the primary activation threshold level plus a margin. In exemplary embodiments, the red threshold level is above the yellow/orange threshold level. In exemplary embodiments including the backup pump 20, the red threshold level is the backup activation threshold level plus a margin. In an exemplary embodiment, the margin is an absolute amount above the primary activation threshold level and/or the backup activation threshold level (e.g., ¼ inch). In an exemplary embodiment, the margin is a percentage of the primary activation threshold level and/or the backup activation threshold level (e.g., 10%). In exemplary embodiments, when the water level is below the yellow/orange threshold level, the water level is assigned the green state. The green state indicates that the water in the sump is at an acceptable level (e.g., generally, there is a low risk of flooding). In exemplary embodiments, when the water level is at or above the yellow/orange threshold level and below the red threshold level, the water level is assigned the yellow/orange state. The yellow/orange state indicates that the water in the sump is above the acceptable level, may be cause for concern, but is not yet at an alarming or unacceptable level (e.g., generally, there is an increased risk of flooding). In exemplary embodiments, when the water level is at or above the red threshold level, the water level is assigned the red state. The red state indicates that the water in the sump is at an alarming or unacceptable level (e.g., there is a high risk of flooding).

In exemplary embodiments, the sump is approximately 16-24 inches in diameter and approximately 20-36 inches deep. In exemplary embodiments, the primary deactivation threshold level is approximately 3-6 inches above a bottom surface of the sump, the primary activation threshold level is approximately 4 inches above the primary deactivation threshold level, the backup deactivation threshold level is approximately 1 inch above the primary activation threshold level, and the backup activation threshold level is approximately 2-6 inches above the backup deactivation threshold level. In exemplary embodiments, the primary discharge pipe 16 and the backup discharge pipe 22 are approximately 8-12 feet long and have an inside diameter of approximately 1-¼ to 2 inches.

In an exemplary embodiment, the sump is approximately 18 inches in diameter and approximately 22 inches deep. In the exemplary embodiment, the primary deactivation threshold level is approximately 3 inches deep (i.e., approximately 3 inches above the bottom surface of the sump), the primary activation threshold level is approximately 7 inches deep (i.e., approximately 4 inches above the primary deactivation threshold level), the backup deactivation threshold level is approximately 8 inches deep (i.e., approximately 1 inch above the primary activation threshold level), and the backup activation threshold level is approximately 12 inches deep (i.e., approximately 4 inches above the backup deactivation threshold level). In the exemplary embodiment, the yellow/orange threshold level is approximately 7-¼ inches deep (i.e., approximately ¼ inch above the primary activation threshold level), and the red threshold level is approximately 12-¼ inches deep (i.e., approximately ¼ inch above the backup activation threshold level). In the exemplary embodiment (where the sump is approximately 18 inches in diameter), every 1 inch of water is approximately 1 gallon of water in the sump. In the exemplary embodiment, the primary discharge pipe 16 and the backup discharge pipe 22 are approximately 10 feet long and have an inside diameter of approximately 1-½ inches.

In an exemplary embodiment, the sump is approximately 24 inches in diameter and approximately 30 inches deep. In the exemplary embodiment, the primary deactivation threshold level is approximately 6 inches deep (i.e., approximately 6 inches above the bottom surface of the sump), the primary activation threshold level is approximately 10 inches deep (i.e., approximately 4 inches above the primary deactivation threshold level), the backup deactivation threshold level is approximately 11 inches deep (i.e., approximately 1 inch above the primary activation threshold level), and the backup activation threshold level is approximately 17 inches deep (i.e., approximately 6 inches above the backup deactivation threshold level). In the exemplary embodiment, the yellow/orange threshold level is approximately 10-¼ inches deep (i.e., approximately ¼ inch above the primary activation threshold level), and the red threshold level is approximately 17-¼ inches deep (i.e., approximately ¼ inch above the backup activation threshold level). In the exemplary embodiment (where the sump is approximately 24 inches in diameter), every 1 inch of water is approximately 2 gallons of water in the sump. In the exemplary embodiment, the primary discharge pipe 16 and the backup discharge pipe 22 are approximately 12 feet long and have an inside diameter of approximately 1-¾ inches.

In the illustrated embodiments, as shown in FIGS. 1-6 and 9-10e, the sump pump system 10 includes a water level sensor 26 (to be described in detail below), the sump pump monitor 12, and a user input/output module 28.

Exemplary embodiments of the sump pump monitor 12 are shown in FIGS. 1-6 and 9-10e. In the illustrated embodiments, the sump pump monitor 12 is operable to mount and electrically connect to the primary power source 18. In the illustrated embodiments, the primary pump 14 is operable to electrically connect to the sump pump monitor 12. In the illustrated embodiments, the sump pump monitor 12 includes a front side and a rear side. The front side is opposite the rear side. In the illustrated embodiments, the front side includes an electrical outlet 12a and a light emitting diode ("LED") 12b. In the illustrated embodiments, a power cord of the primary pump 14 plugs into the electrical outlet 12a on the front side. In an exemplary embodiment, the front side includes a display in place of or in addition to the LED 12b. In the illustrated embodiments, the rear side includes an electrical plug 12c and a battery compartment 12d. In the illustrated embodiments, the sump pump monitor 12 includes a top side and a bottom side. The top side is opposite the bottom side. In the illustrated embodiments, the bottom side includes electrical connections. In the illustrated embodiments, the electrical connections include a USB-A port 12e, an RJ45 port 12f, and a 3.5 mm audio jack 12g. In the illustrated embodiments, a power/communication cord of the water level sensor 26 plugs into the USB-A port 12e on the bottom side.

In the illustrated embodiments, as shown in FIGS. 4-6, the sump pump monitor 12 includes a number of electronic components. These components control the operation and/or the monitoring of the sump pump system 10, including the primary pump 14 and/or the backup pump 20. In the illustrated embodiments, the sump pump monitor 12 includes a pump parameter sensor 30, a clock/timer 32, and a printed circuit board ("PCB") 34. In the illustrated embodiments, a number of electronic components are mounted on the PCB 34, including, but not limited to, a processor 36, memory 38, a wireless communication chip or module 40, and a power port 42.

In exemplary embodiments, the pump parameter sensor 30 is operable to detect a parameter relating to operation of the primary pump 14. In exemplary embodiments, the pump parameter sensor 30 is operable to detect at least one of current, voltage, vibration, and noise. In exemplary embodiments, the pump parameter sensor 30 is a pump current sensor and is operable to detect whether current is flowing to the primary pump 14. In exemplary embodiments, the parameter detected by the pump parameter sensor 30 is used to determine whether the primary pump 14 is running.

In an exemplary embodiment, the pump current sensor is the ACS716 current sensor made by Allegro Microsystems. The ACS716 current sensor is described in detail in ACS716-DS, Rev. 9, MCO-0000201 dated Feb. 3, 2020, which is available on the Allegro Microsystems web site (www.allegromicro.com) at https://www.allegromicro.com/-/media/files/datasheets/acs716-datasheet.ashx, and which is hereby incorporated by reference. Additional documentation regarding the ACS716 current sensor is available on the Allegro Microsystems web site at https://www.allegromicro.com/en/products/sense/current-sensor-ics/zero-to-fifty-amp-integrated-conductor-sensor-ics/acs716 and https://www.allegromicro.com/en/products/sense/current-sensor-ics/zero-to-fifty-amp-integrated-conductor-sensor-ics/acs716/allegro-acs716-fully-integrated-current-sensor-ics-for-use-in-3_3-v-applications.

Although the sump pump system 10 has been described as including the water level sensor 26 and the pump parameter sensor 30, one of ordinary skill in the art will appreciate that, in certain embodiments, the sump pump system 10 could include other sensors. Additionally, although the sump pump monitor 12 has been described as including the pump parameter sensor 30, one of ordinary skill in the art will appreciate that, in certain embodiments, the pump parameter sensor 30 could be in other locations in the sump pump system 10 (e.g., the pump parameter sensor 30 could be attached to the primary pump 14).

In exemplary embodiments, the clock/timer 32 is operable to provide a date and a time of an action or to measure time intervals. For example, the clock/timer 32 can determine when the primary pump 14 activated/deactivated and how long the primary pump 14 operated. In exemplary embodiments, the processor 36 includes an internal clock/timer. Any timing of actions or steps described herein could be provided by the clock/timer 32 or the internal clock/timer of the processor 36. Clock/timers are well known in the art and will not be described in greater detail.

In exemplary embodiments, the processor 36 is operable to receive signals from and sends signals to components of the sump pump system 10 to control the operation and/or the monitoring of the sump pump system 10, including the primary pump 14 and/or the backup pump 20. For example, the processor 36 is operable to receive signals from the sensors (e.g., the water level sensor 26 and the pump parameter sensor 30), the user input/output module 28, and other components of the sump pump system 10 and sends signals to the primary pump 14, the user input/output module 28, and other components of the sump pump system 10 to control the operation and/or the monitoring of the sump pump system 10, including the primary pump 14 and/or the backup pump 20. In exemplary embodiments, the memory 38 is operable to save information received from components of the sump pump system 10. In exemplary embodiments, the wireless communication chip or module 40 is operable to control wireless communication between components of the sump pump system 10. In exemplary embodiments, the power port 42 is operable to provide power to components of the sump pump system 10.

In the illustrated embodiments, as shown in FIGS. 1 and 3-6, the sump pump system 10 includes a system provider cloud server 44 and a third party cloud server 46. The system provider cloud server 44 could be hosted by a system provider (such as a sump pump system manufacturer), and the third party cloud server 46 could be hosted by a third party (such as Amazon, Google, HomeKit, and IFTTT). In the illustrated embodiments, each of the system provider cloud server 44 and the third party cloud server 46 includes a processor 44*a*, 46*a* and memory 44*b*, 46*b*. The signals received from and sent to components of the sump pump system 10 to control the operation and/or the monitoring of the sump pump system 10 can be received from and sent to the processor 44*a* in the system provider cloud server 44 and/or the processor 46*a* in the third party cloud server 46 in addition to or alternatively to the processor 36 in the sump pump monitor 12. Similarly, the information received from components of the sump pump system 10 can be saved in the memory 44*b* in the system provider cloud server 44 and/or the memory 46*b* in the third party cloud server 46 in addition to or alternatively to the memory 38 in the sump pump monitor 12. Further, the information received from components of the sump pump system 10 can be saved in the user input/output module 28 (where the user input/output module 28 includes memory, such as Apple iPhone and Google Android).

As used herein, unless stated otherwise, "processor" includes any one or more of the processor 36 in the sump pump monitor 12, the processor 44*a* in the system provider cloud server 44, and the processor 46*a* in the third party cloud server 46. Similarly, as used herein, unless stated otherwise, "memory" includes any one or more of the memory 38 in the sump pump monitor 12, the memory 44*b* in the system provider cloud server 44, the memory 46*b* in the third party cloud server 46, and the memory in the user input/output module 28.

In exemplary embodiments, the user input/output module 28 is operable to receive input (e.g., information and/or instructions) from a user, provide the input to components of the sump pump system 10 (e.g., the processor), receive output (e.g., information and/or notifications) from components of the sump pump system 10 (e.g., the processor), and display the output to the user. In exemplary embodiments, the user input/output module 28 is operable to receive input from the user and send signals to the processor to control the operation and/or the monitoring of the sump pump system 10. Additionally, the user input/output module 28 is operable to receive signals from the processor and display output to the user. The user input/output module 28 can send signals to and receive signals from the processor directly and/or indirectly (e.g., through other components of the sump pump system 10 and/or through other components outside of the sump pump system 10).

The user input/output module 28 can include any device that enables input from the user and/or output to the user. In exemplary embodiments, the user input/output module 28 includes electronic input/output device(s) 48 and manual input/output device(s) 50. Exemplary electronic input/output devices 48 include mobile devices, smart hubs, touch screen devices, and push button devices. Exemplary mobile devices include Apple iPhone and Google Android. Exemplary smart hubs include Amazon Echo, Apple HomePod, and Google Nest. Exemplary manual input/output devices 50 include handles and joysticks.

In exemplary embodiments, the user input/output module 28 includes a mobile device 52 that can be held and/or moved by the user and a smart hub 54 that can be held and/or moved by the user. However, one of ordinary skill in the art will appreciate that the user input/output module 28 could include any number of devices, and each device of the user input/output module 28 could include any number of components. Moreover, one of ordinary skill in the art will appreciate that each device of the user input/output module 28 could be in any location where it can, at some point in time, send signals to and/or receive signals from other components of the sump pump system 10 (e.g., the processor), or each device of the user input/output module 28 could be integrally formed with or physically connected to other components of the sump pump system 10 (e.g., the sump pump monitor 12).

In exemplary embodiments, some components of the sump pump system 10 are connected to each other via a wireless communication connection or network interface 56, while other components of the sump pump system 10 are connected to each other via a wired communication connection or network interface 58. In exemplary embodiments, some components of the sump pump system 10 are operable to send signals to and/or receive signals from each other via the wireless communication connection or network interface 56, while other components of the sump pump system 10 are operable to send signals to and/or receive signals from each other via the wired communication connection or network interface 58.

One of ordinary skill in the art will appreciate that each component of the sump pump system 10 could be connected to each other component of the sump pump system 10 and send signals to and/or receive signals from each other component of the sump pump system 10 via any one type or combination of types of wireless communication connection(s) or network interface(s) 56 and/or wired communication connection(s) or network interface(s) 58. Further, one of ordinary skill in the art will appreciate that the wireless communication connection or network interface 56 and/or the wired communication connection or network interface 58 could be direct or indirect (e.g., via a router or a network hub). Moreover, one of ordinary skill in the art will appreciate that the wireless communication connection or network interface 56 could include any one type or any combination of different types of wireless communication connection(s) or network interface(s), including, but not limited to, Wi-Fi, Bluetooth, cellular, near field communication (NFC), Zigbee, Z-Wave and Thread.

In the illustrated embodiments, as shown in FIGS. 1 and 3-6, some components of the user input/output module 28 (e.g., the mobile devices and the smart hubs) are connected to other components of the sump pump system 10 (e.g., the processor) via the wireless communication connection or network interface 56, while other components of the user input/output module 28 (e.g., the touch screen devices and the push button devices) are connected to other components of the sump pump system 10 (e.g., the processor) via the wired communication connection or network interface 58. In the illustrated embodiments, as shown in FIGS. 1 and 3-6, some components of the user input/output module 28 (e.g., the mobile devices and the smart hubs) are operable to send signals to and/or receive signals from other components of the sump pump system 10 (e.g., the processor) via the wireless communication connection or network interface 56, while other components of the user input/output module 28 (e.g., the touch screen devices and the push button devices) are operable to send signals to and/or receive signals from other components of the sump pump system 10 (e.g., the processor) via the wired communication connection or network interface 58.

For example, in the illustrated embodiments, as best shown in FIGS. 1 and 3, the mobile device 52 and the smart hub 54 are connected to the sump pump monitor 12 via the wireless communication connection or network interface 56. As stated above, this wireless communication connection or network interface 56 could be direct or indirect. In the illustrated embodiments, as best shown in FIGS. 1 and 3, the mobile device 52 and the smart hub 54 are connected to the sump pump monitor 12 via the system provider cloud server 44 and/or the third party cloud server 46 (i.e., the wireless communication connection or network interface 56 is indirect). In the illustrated embodiments, as best shown in FIGS. 1 and 3, the mobile device 52 and the smart hub 54 are connected to the sump pump monitor 12 via multiple different wireless communication connections or network interfaces 56 to provide redundancy in the event of a failure of one of the wireless communication connections or network interfaces 56. As stated above, each of these wireless communication connections or network interfaces 56 could be direct or indirect.

As stated above, one of ordinary skill in the art will appreciate that each component of the user input/output module 28 could be connected to each other component of the sump pump system 10 (e.g., the processor) and send signals to and/or receive signals from each other component of the sump pump system 10 (e.g., the processor) via any one type or combination of different types of wireless communication connection(s) or network interface(s) 56 and/or wired communication connection(s) or network interface(s) 58. Further, one of ordinary skill in the art will appreciate that the wireless communication connection or network interface 56 and/or the wired communication connection or network interface 58 could be direct or indirect (e.g., via a router or a network hub). Moreover, one of ordinary skill in the art will appreciate that the wireless communication connection or network interface 56 could include any one type or any combination of different types of wireless communication connection(s) or network interface(s), including, but not limited to, Wi-Fi, Bluetooth, cellular, near field communication (NFC), Zigbee, Z-Wave, and Thread.

In the illustrated embodiments, as shown in FIGS. 1 and 3-6, the system provider cloud server 44 and the third party cloud server 46 are connected to other components of the sump pump system 10 (e.g., the processor 36) via the wireless communication connection or network interface 56. In the illustrated embodiments, as shown in FIGS. 1 and 3-6, the system provider cloud server 44 and the third party cloud server 46 are operable to send signals to and/or receive signals from other components of the electronic plumbing system (e.g., the processor 36) via the wireless communication connection or network interface 56.

As stated above, one of ordinary skill in the art will appreciate that the system provider cloud server 44 and the third party cloud server 46 could be connected to other components of the sump pump system 10 (e.g., the processor) and send signals to and/or receive signals from other components of the sump pump system 10 (e.g., the processor) via any one type or combination of different types of wireless communication connection(s) or network interface(s) 56 and/or wired communication connection(s) or network interface(s) 58. Further, one of ordinary skill in the art will appreciate that the wireless communication connection or network interface 56 and/or the wired communication connection or network interface 58 could be direct or indirect (e.g., via a router or a network hub). Moreover, one of ordinary skill in the art will appreciate that the wireless communication connection or network interface 56 could include any one type or any combination of different types of wireless communication connection(s) or network interface(s), including, but not limited to, Wi-Fi, Bluetooth, cellular, near field communication (NFC), Zigbee, Z-Wave, and Thread.

In the illustrated embodiments, as shown in FIGS. 1-6 and 10, the sensors (e.g., the water level sensor 26 and the pump parameter sensor 30) are connected to the sump pump monitor 12 (and, thus, the processor 36) via the wired communication connection or network interface 58. In the illustrated embodiments, as shown in FIGS. 1-6 and 10, the sensors (e.g., the water level sensor 26 and the pump parameter sensor 30) are operable to send signals to and/or receive signals from the sump pump monitor 12 (and, thus, the processor 36) via the wired communication connection or network interface 58.

In the illustrated embodiments, as shown in FIGS. 1-5, the primary power source 18 is operable to provide power to electrical/electronic components of the sump pump system 10, including the primary pump 14, and the backup power source 24 is operable to provide power to the backup pump 20. In the illustrated embodiment, as shown in FIG. 6, the primary power source 18 is operable to provide power to electrical/electronic components of the sump pump system 10, including the primary pump 14 and the backup pump 20, and the backup power source 24 is also operable to provide power to the backup pump 20. In the illustrated embodiments, the primary power source 18 is operable to mount in a wall or other mounting surface near the sump. In the illustrated embodiments, the primary power source 18 is connected to the sump pump monitor 12, and thus the primary pump 14 (and the backup pump 20 when the primary power source 18 provides power to the backup pump 20), via the wired communication connection or network interface 58.

In the illustrated embodiments, the primary power source 18 includes AC power. In the illustrated embodiments, the backup power source 24 is operable to mount on a floor or other mounting surface near the sump. In the illustrated embodiments, the backup power source 24 is connected to the backup pump 20 via the wired communication connection or network interface 58. In the illustrated embodiments, the backup power source 24 includes battery power.

As stated above, one of ordinary skill in the art will appreciate that the sensors (e.g., the water level sensor 26 and the pump parameter sensor 30) and the power sources (e.g., the primary power source 18 and/or the backup power source 24) could be connected to the sump pump monitor 12 and/or other components of the sump pump system 10 (e.g., the processor) and send signals to and/or receive signals from the sump pump monitor 12 and/or other components of the sump pump system 10 (e.g., the processor) via any one type or combination of different types of wireless communication connection(s) or network interface(s) 56 and/or wired communication connection(s) or network interface(s) 58. Further, one of ordinary skill in the art will appreciate that the wireless communication connection or network interface 56 and/or the wired communication connection or network interface 58 could be direct or indirect (e.g., via a router or a network hub). Moreover, one of ordinary skill in the art will appreciate that the wireless communication connection or network interface 56 could include any one type or any combination of different types of wireless communication connection(s) or network interface(s), including, but not limited to, Wi-Fi, Bluetooth, cellular, near field communication (NFC), Zigbee, Z-Wave, and Thread.

In the illustrated embodiment, as shown in FIG. 6, the sump pump system 10 includes a trickle charger 60 for the backup power source 24. The trickle charger 60 is electrically connected to the backup power source 24. In the illustrated embodiment, the trickle charger 60 is electrically connected to the sump pump monitor 12.

In an exemplary embodiment, the sump pump system 10 is installed. The installation includes installing a primary check valve 62 in the primary discharge pipe 16. Additionally, if the sump pump system 10 includes a backup pump 20, the installation includes installing a backup check valve 64 in the backup discharge pipe 22.

In exemplary embodiments, as shown in FIGS. 1-6, during operation of the sump pump system 10 using the water level sensor 26, the water level sensor 26 detects the level of water in the sump. The water level sensor 26 sends a signal to the processor 36 in the sump pump monitor 12 via the wired communication connection or network interface 58. The processor 36 in the sump pump monitor 12 receives the signal from the water level sensor 26. The processor 36 in the sump pump monitor 12 appropriately controls the operation and/or the monitoring of the sump pump system 10.

In exemplary embodiments, as shown in FIGS. 4-6, during operation of the sump pump system 10 using the pump parameter sensor 30, the pump parameter sensor 30 detects the parameter relating to the operation of the primary pump 14. The pump parameter sensor 30 sends a signal to the processor 36 in the sump pump monitor 12 via the wired communication connection or network interface 58. The processor 36 in the sump pump monitor 12 receives the signal from the pump parameter sensor 30. The processor 36 in the sump pump monitor 12 appropriately controls the operation and/or the monitoring of the sump pump system 10.

In exemplary embodiments, as best shown in FIGS. 1 and 3, during operation of the sump pump system 10 using the mobile device 52, the user receives output via the mobile device 52 (e.g., the user receives information and/or notifications on the mobile device 52). The processor 36 in the sump pump monitor 12 sends a signal to the processor 44a in the system provider cloud server 44 via the wireless communication connection or network interface 56. The processor 44a in the system provider cloud server 44 receives the signal from the processor 36 in the sump pump monitor 12 and sends a signal to the mobile device 52 via the wireless communication connection or network interface 56. The mobile device 52 receives the signal from the processor 44a in the system provider cloud server 44 and conveys to the user the information and/or notifications regarding the operation and/or the monitoring of the sump pump system 10 (e.g., displays to the user the information and/or notifications).

In exemplary embodiments, as best shown in FIGS. 1 and 3, during operation of the sump pump system 10 using the smart hub 54, the user receives output via the smart hub 54 (e.g., the user receives information and/or notifications from the smart hub 54). The processor 36 in the sump pump monitor 12 sends a signal to the processor 44a in the system provider cloud server 44 via the wireless communication connection or network interface 56. The processor 44a in the system provider cloud server 44 receives the signal from the processor 36 in the sump pump monitor 12 and sends a signal to the processor 46a in the third party cloud server 46 via the wireless communication connection or network interface 56. The processor 46a in the third party cloud server 46 receives the signal from the processor 44a in the system provider cloud server 44 and sends a signal to the smart hub 54 via the wireless communication connection or network interface 56. The smart hub 54 receives the signal from the processor 46a in the third party cloud server 46 and conveys to the user the information and/or notifications regarding the operation and/or the monitoring of the sump pump system 10 (e.g., speaks to the user the information and/or notifications).

In exemplary embodiments, as best shown in FIGS. 1 and 3, during operation of the sump pump system 10 using the mobile device 52, the user enters input via the mobile device 52 (e.g., the user presses a button on the mobile device 52). The mobile device 52 receives the input from the user and sends a signal to the processor 44a in the system provider cloud server 44 via the wireless communication connection or network interface 56. The processor 44a in the system provider cloud server 44 receives the signal from the mobile device 52 and sends a signal to the processor 36 in the sump pump monitor 12 via the wireless communication connection or network interface 56. The processor 36 in the sump pump monitor 12 receives the signal from the processor 44a in the system provider cloud server 44. The processor 36 in the sump pump monitor 12 appropriately controls the operation and/or the monitoring of the sump pump system 10.

In exemplary embodiments, as best shown in FIGS. 1 and 3, during operation of the sump pump system 10 using the smart hub 54, the user enters input via the smart hub 54 (e.g., the user states a command to the smart hub 54). The smart hub 54 receives the input from the user and sends a signal to the processor 46a in the third party cloud server 46 via the wireless communication connection or network interface 56. The processor 46a in the third party cloud server 46 receives the signal from the smart hub 54 and sends a signal to the processor 44a in the system provider cloud server 44 via the wireless communication connection or network interface 56. The processor 44a in the system provider cloud server 44 receives the signal from the processor 46a in the third party cloud server 46 and sends a signal to the processor 36 in the sump pump monitor 12 via the wireless communication connection or network interface 56. The processor 36 in the sump pump monitor 12 receives the signal from the processor 44a in the system provider cloud server 44. The processor 36 in the sump pump monitor 12 appropriately controls the operation and/or the monitoring of the sump pump system 10.

Water Level Sensor Assembly, Including Water Level Sensor and Shield

In the illustrated embodiments, as shown in FIGS. 11-15c, a water level sensor assembly 66 includes the water level sensor 26, a printed circuit board ("PCB") 68, a lens 70, a USB cable and connector 72, a strain relief mechanism 74, and a housing 76. In the illustrated embodiments, the housing 76 includes an upper outer housing 78, a mounting bracket 80, an upper inner housing 82, and a lower housing 84. Additionally, in the illustrated embodiments, the water level sensor assembly 66 includes multiple seals. More specifically, in the illustrated embodiments, the water level sensor assembly 66 includes an upper O-ring 86, a lower O-ring 88, and a grommet 90.

In exemplary embodiments, the water level sensor 26 is operable to detect the level of water in the sump. The operation of the water level sensor 26 is distinguished from the operation of the primary float in the primary pump 14 and the backup float in the backup pump 20. As discussed above, when the primary/backup float determines that the water level has reached the primary/backup activation threshold level, the primary/backup float triggers the primary/backup switch, which in turn activates the primary pump 14/backup pump 20. The water level detected by the water level sensor 26 will be used by the sump pump system 10.

In exemplary embodiments, the water level sensor 26 is operable to be mounted above the sump, e.g., on one of the primary discharge pipe 16 and the backup discharge pipe 22. In the illustrated embodiments, the water level sensor 26 is operable to be mounted on the primary discharge pipe 16. However, one of ordinary skill in the art will appreciate that the water level sensor 26 can be mounted in any location where it can detect the level of water in the sump (i.e., where it has a line of sight to the water in the sump).

Figure 11:
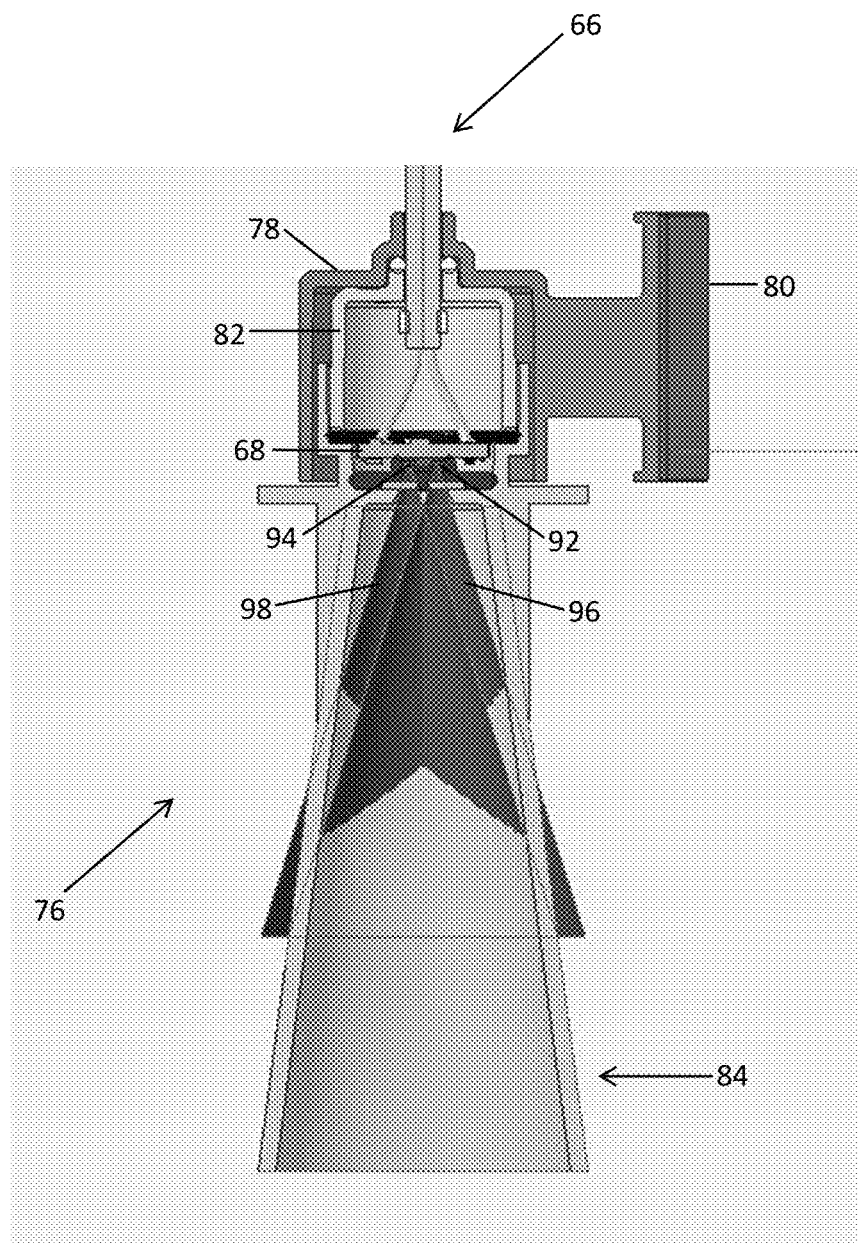
FIG. 11 is a longitudinal cross-sectional view of a water level sensor assembly, showing a transmitter exclusion zone extending from a transmitter of a water level sensor and a receiver exclusion zone extending from a receiver of the water level sensor.
Figure 14:
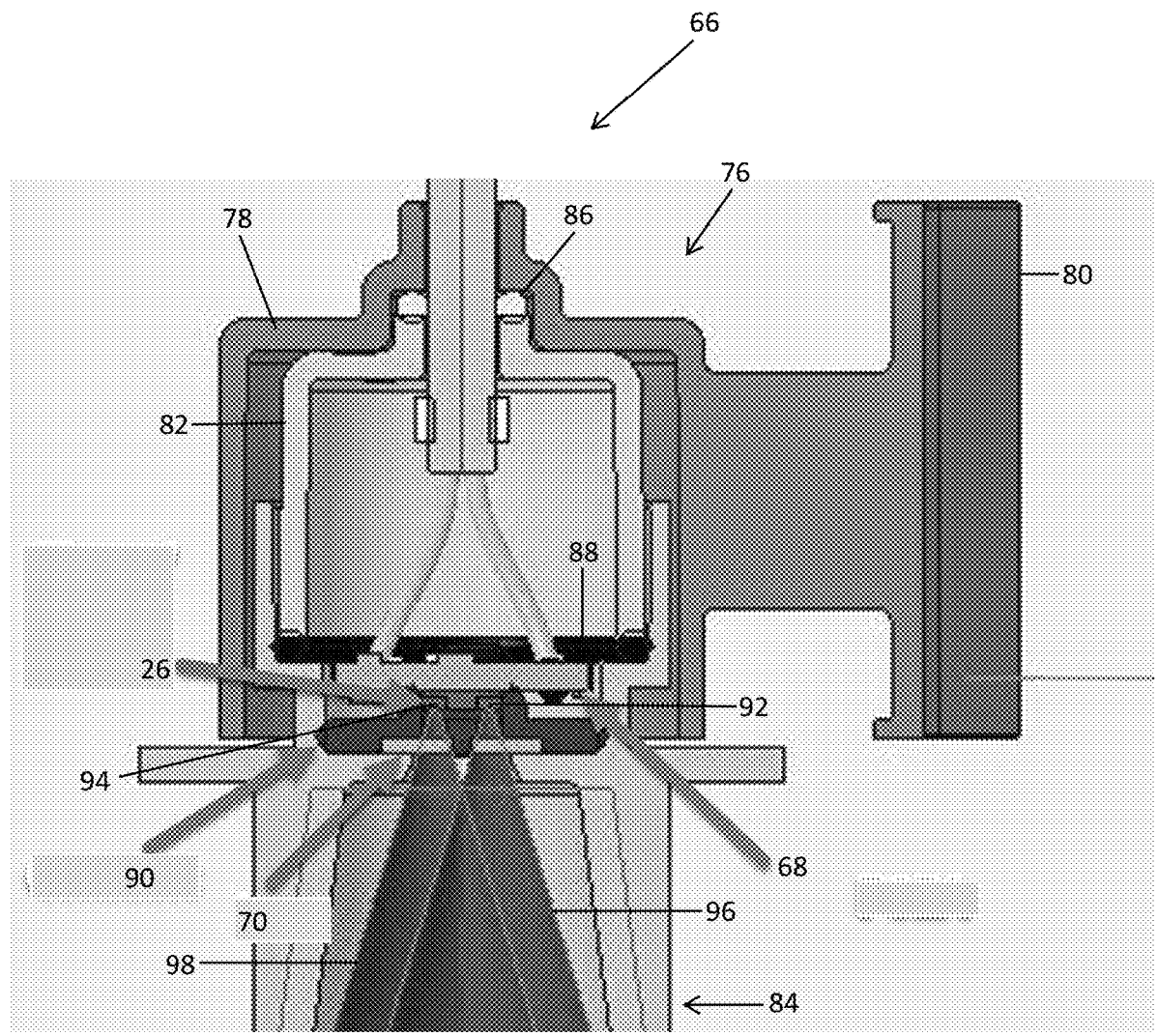
FIG. 14 is a longitudinal cross-sectional view of the water level sensor assembly of FIG. 11, showing a more detailed view of certain components of the water level sensor assembly.
Figure 15A:
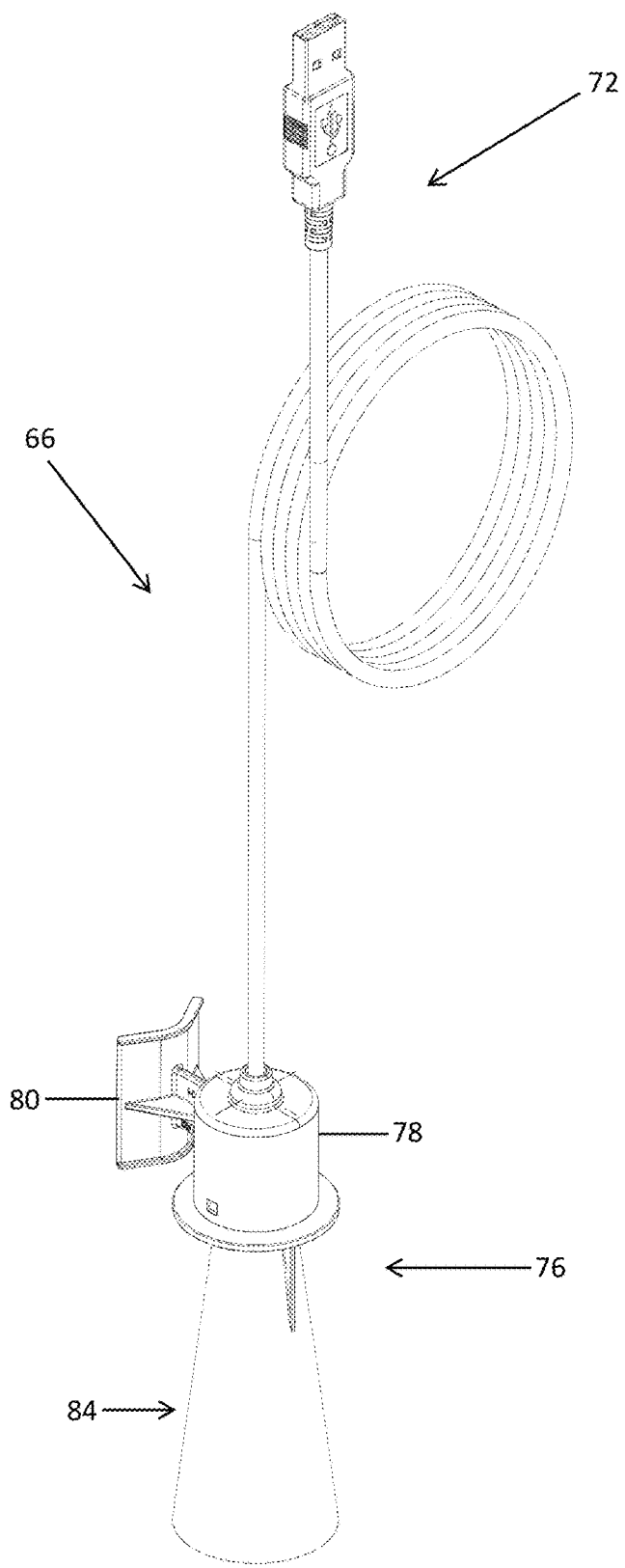
FIGS. 15a-15c are views of an exemplary embodiment of the water level sensor assembly of FIGS. 11-14
Figure 15B:
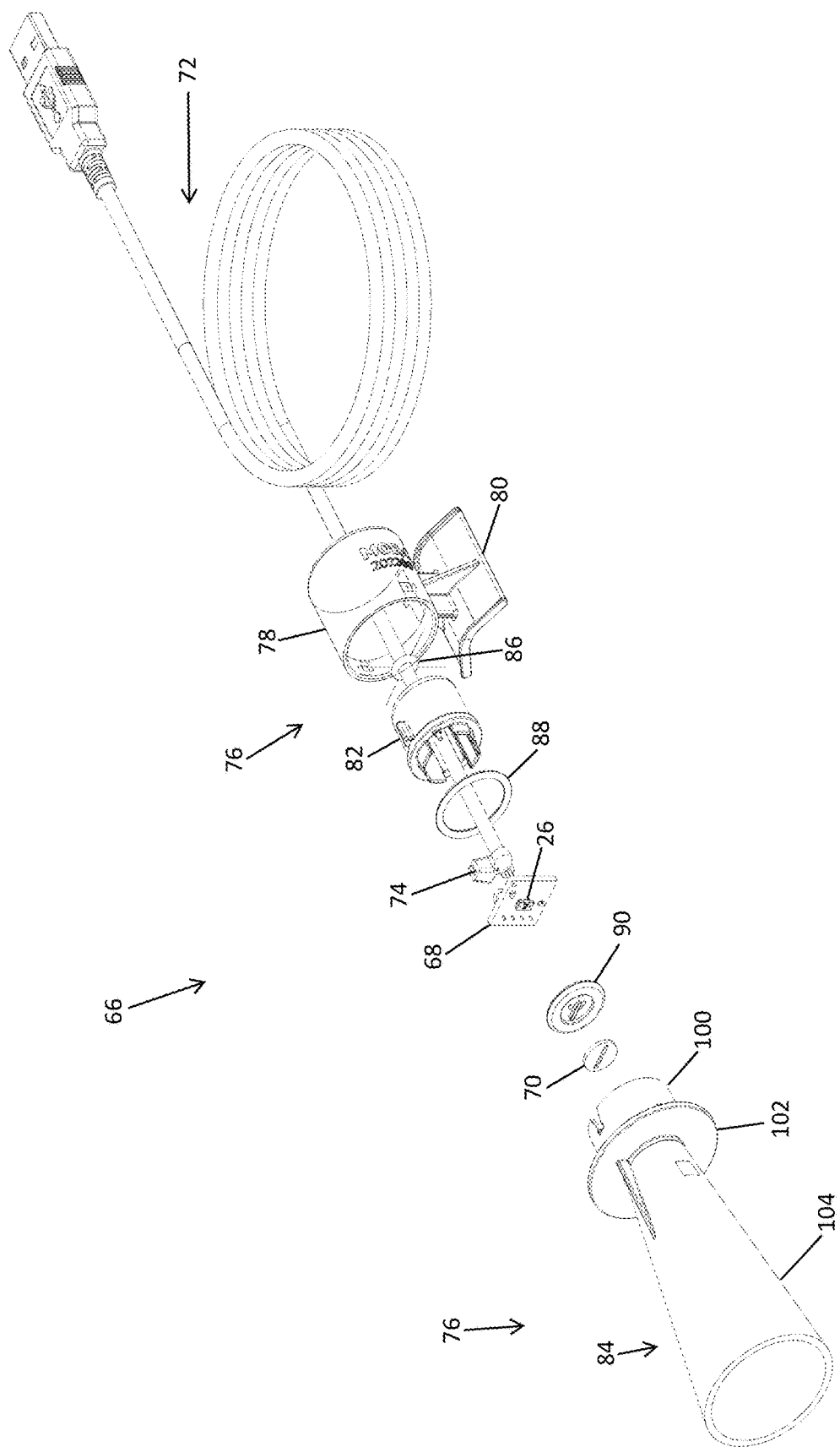
Figure 15C:
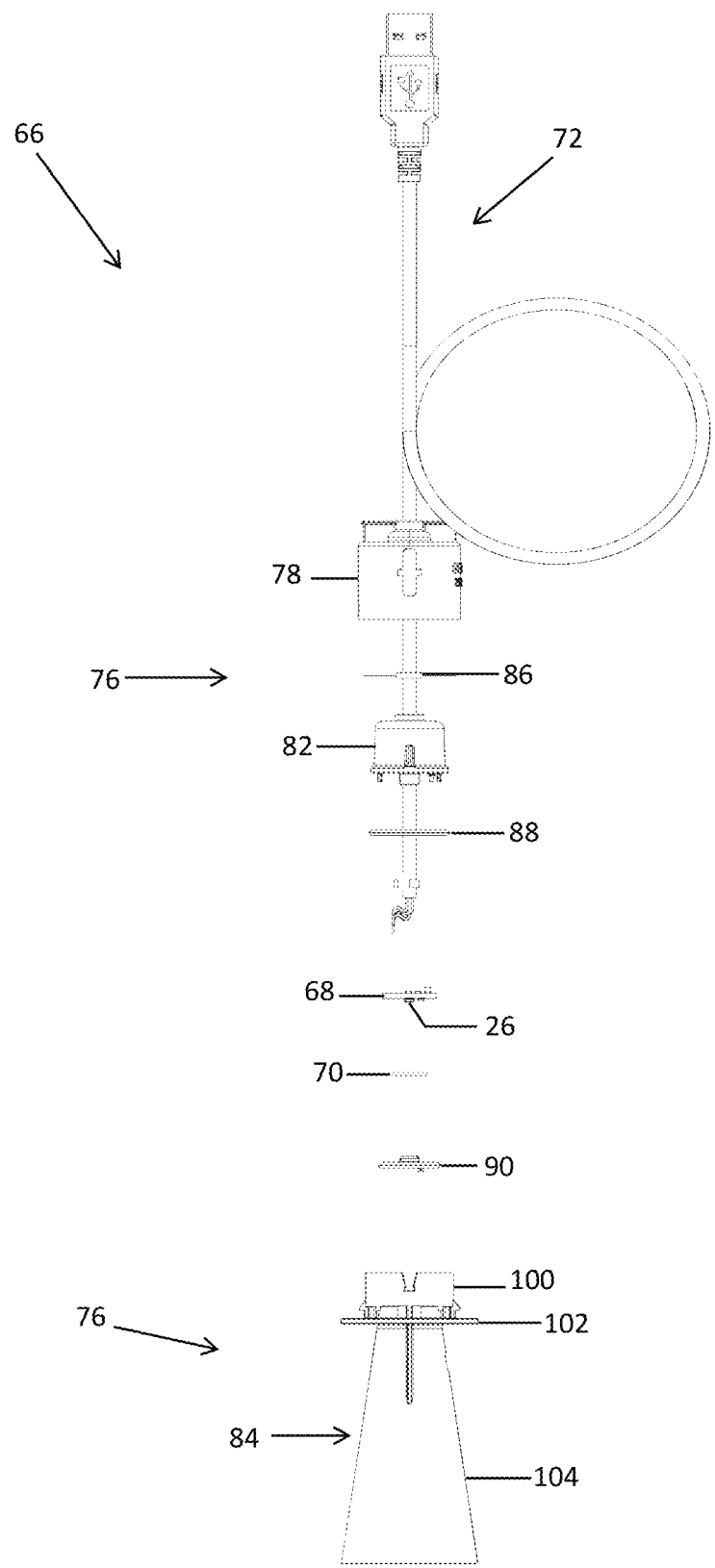

In exemplary embodiments, the water level sensor 26 includes an emitter or transmitter 92 and a collector or receiver 94. In the illustrated embodiments, as best shown in FIGS. 11 and 14, the transmitter 92 is on the right, and the receiver 94 is on the left. The transmitter 92 is operable to emit light, and the receiver 94 is operable to receive light. The transmitter 92 has a transmitter exclusion cone or zone 96 that extends from the transmitter 92. In an exemplary embodiment, an opening angle of the transmitter exclusion zone 96 is approximately thirty-five degrees (35°). The receiver 94 has a receiver exclusion cone or zone 98 that extends from the receiver 94. In an exemplary embodiment, an opening angle of the receiver exclusion zone 98 is approximately twenty-five degrees (25°). However, one of ordinary skill in the art will appreciate that the opening angle of the transmitter exclusion zone 96 and/or the opening angle of the receiver exclusion zone 98 could be smaller or larger.

In exemplary embodiments, the water level sensor 26 is a time of flight ("ToF") sensor. In an exemplary embodiment, the water level sensor 26 is the VL53L0X ToF sensor made by STMicroelectronics. The VL53L0X ToF sensor is described in detail in DocID029104 Rev 2 dated April 2018 and DocID029711 Rev 3 dated November 2018, both of which are available on the STMicroelectronics web site (www.st.com) at https://www.st.com/resource/en/datasheet/vl53l0x.pdf and https://www.st.com/resource/en/applicationnote/dm00326504-vl53l0x-ranging-module-cover-window-guidelines-stmicroelectronics.pdf, respectively, and both of which are hereby incorporated by reference. Additional documentation regarding the VL53L0X ToF sensor is available on the STMicroelectronics web site at https://www.st.com/en/imaging-and-photonics-solutions/vl53l0x.html #documentation. However, one of ordinary skill in the art will appreciate that the water level sensor 26 could be any type of electronic sensor that can determine the level of water in the sump.

In exemplary embodiments, the PCB 68 is operable to have electronic components mounted thereon. In the illustrated embodiments, the water level sensor 26 is mounted on the PCB 68.

In the illustrated embodiments, the lens 70 is operable to provide protection for the water level sensor 26. In an exemplary embodiment, the lens 70 is made from a plastic. In an exemplary embodiment, the lens 70 is made from acrylic.

In the illustrated embodiments, the USB cable and connector 72 is operable to electrically connect the water level sensor 26 to the sump pump monitor 12.

In the illustrated embodiments, the strain relief mechanism 74 is operable to provide strain relief for the USB cable and connector 72. In the illustrated embodiments, the strain relief mechanism 74 is a zip tie.

In the illustrated embodiments, the upper outer housing 78 is operable to provide protection for the PCB 68, the water level sensor 26, and the lens 70. In an exemplary embodiment, the upper outer housing 78 is made from a plastic. In an exemplary embodiment, the upper outer housing 78 is made from nylon 12.

In exemplary embodiments, the mounting bracket 80 is operable to mount the water level sensor assembly 66 above the sump. In the illustrated embodiments, the mounting bracket 80 is operable to mount the water level sensor assembly 66 on one of the primary discharge pipe 16 and the backup discharge pipe 22. In an exemplary embodiment, the mounting bracket 80 is integrally formed with the upper outer housing 78. However, one of ordinary skill in the art will appreciate that the mounting bracket 80 could be separately formed from the upper outer housing 78 or could be integrally formed with another component of the water level sensor assembly 66. In an exemplary embodiment, the mounting bracket 80 is made from a plastic. In an exemplary embodiment, the mounting bracket 80 is made from nylon 12.

In the illustrated embodiments, the upper inner housing 82 is operable to retain the lower O-ring 88, the PCB 68, the water level sensor 26, the grommet 90, and the lens 70 against the lower housing 84. In an exemplary embodiment, the upper inner housing 82 is separately formed from the upper outer housing 78. However, one of ordinary skill in the art will appreciate that the upper inner housing 82 could be integrally formed with the upper outer housing 78 or could be integrally formed with another component of the water level sensor assembly 66. In an exemplary embodiment, the upper inner housing 82 is made from a plastic. In an exemplary embodiment, the upper inner housing 82 is made from an acetal copolymer grade M90.

In the illustrated embodiments, the upper O-ring 86 is located and operable to provide sealing between the upper outer housing 78 and the upper inner housing 82. In the illustrated embodiments, the lower O-ring 88 is located and operable to provide sealing between the upper inner housing 82 and the lower housing 84. In exemplary embodiments, the upper O-ring 86 and the lower O-ring 88 are made from a rubber. In the illustrated embodiments, the grommet 90 is located and operable to provide sealing between the PCB 68 and the lower housing 84. In an exemplary embodiment, the grommet 90 is made from a polymer. In an exemplary embodiment, the grommet 90 is made from a thermoplastic elastomer ("TPE").

Figure 12:
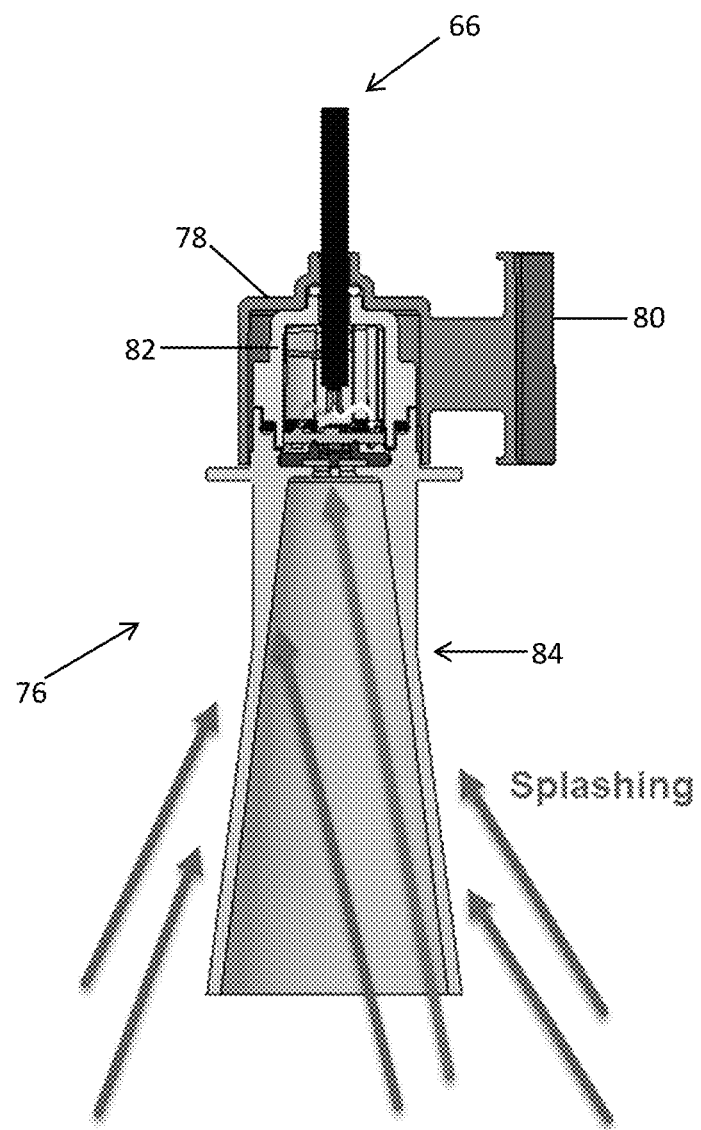
FIG. 12 is a longitudinal cross-sectional view of the water level sensor assembly of FIG. 11, showing a reduction of splashing on a lens for the water level sensor.
Figure 13:
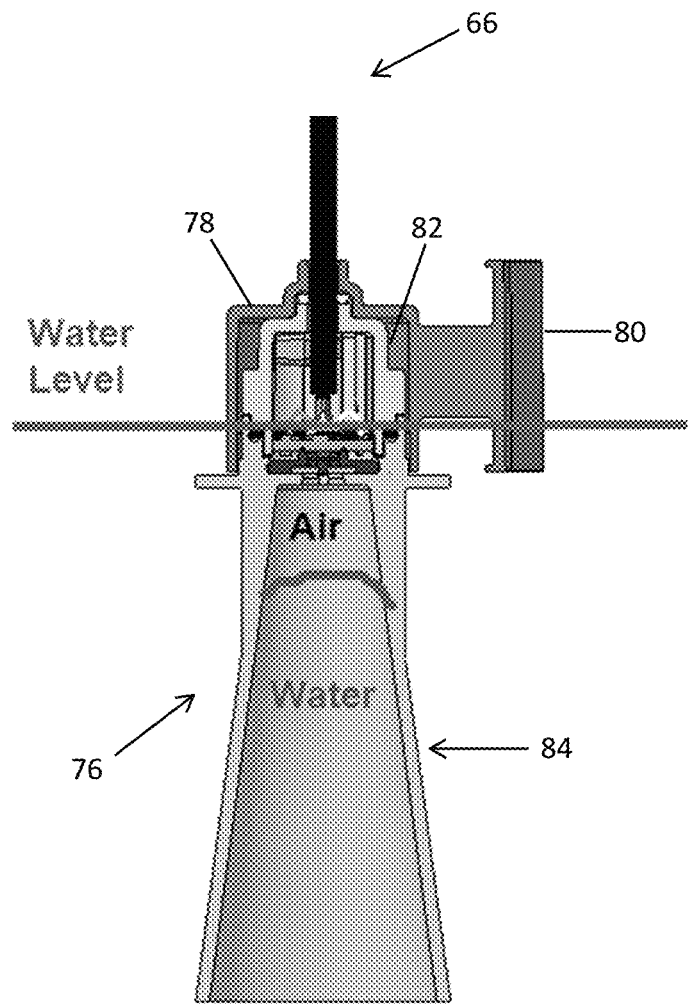
FIG. 13 is a longitudinal cross-sectional view of the water level sensor assembly of FIG. 11, showing an air trap created in a lower housing below the lens for the water level sensor.

In exemplary embodiments, the lower housing 84 is operable to provide protection for the water level sensor 26 and, thus, improve performance of the water level sensor 26. In exemplary embodiments, as best shown in FIG. 12, the lower housing 84 is operable to reduce splashing on the lens 70. In exemplary embodiments, as best shown in FIG. 13, the lower housing 84 is operable to create an air trap to prevent water from reaching the lens 70. In exemplary embodiments, as best shown in FIGS. 11-14, the lower housing 84 is operable to reduce ambient light reaching the water level sensor 26.

In the illustrated embodiments, as best shown in FIGS. 16a-16e, the lower housing 84 includes an upper portion 100, a flange 102, and a lower portion 104.

Figure 16B:
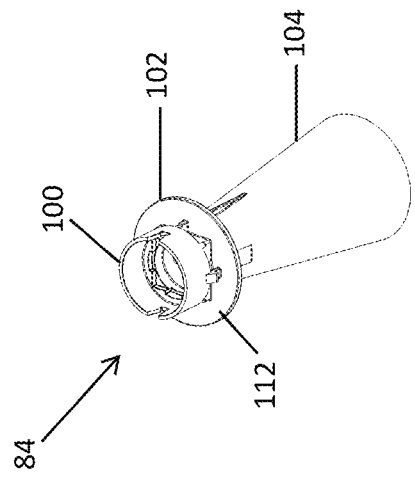
FIGS. 16a-16e are views of an exemplary embodiment of a lower housing of the water level sensor assembly of FIGS. 15a-15c
Figure 16D:
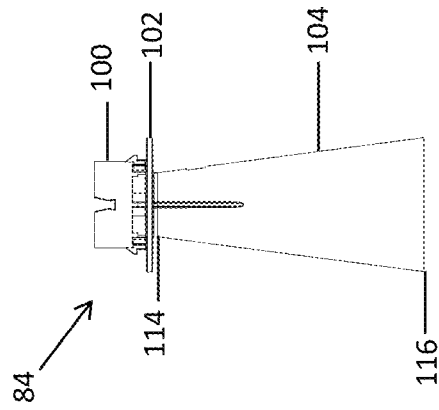
Figure 16A:
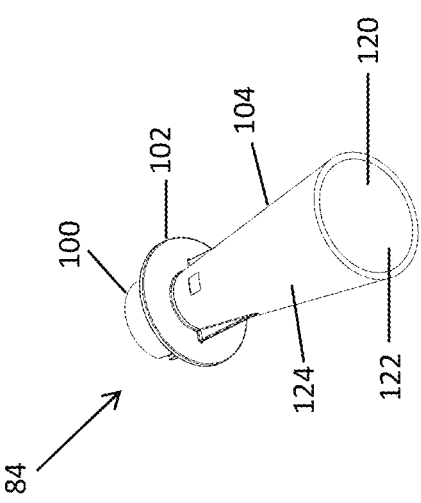
Figure 16C:
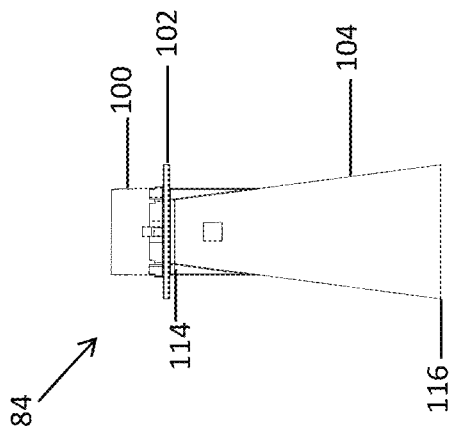
Figure 16E:
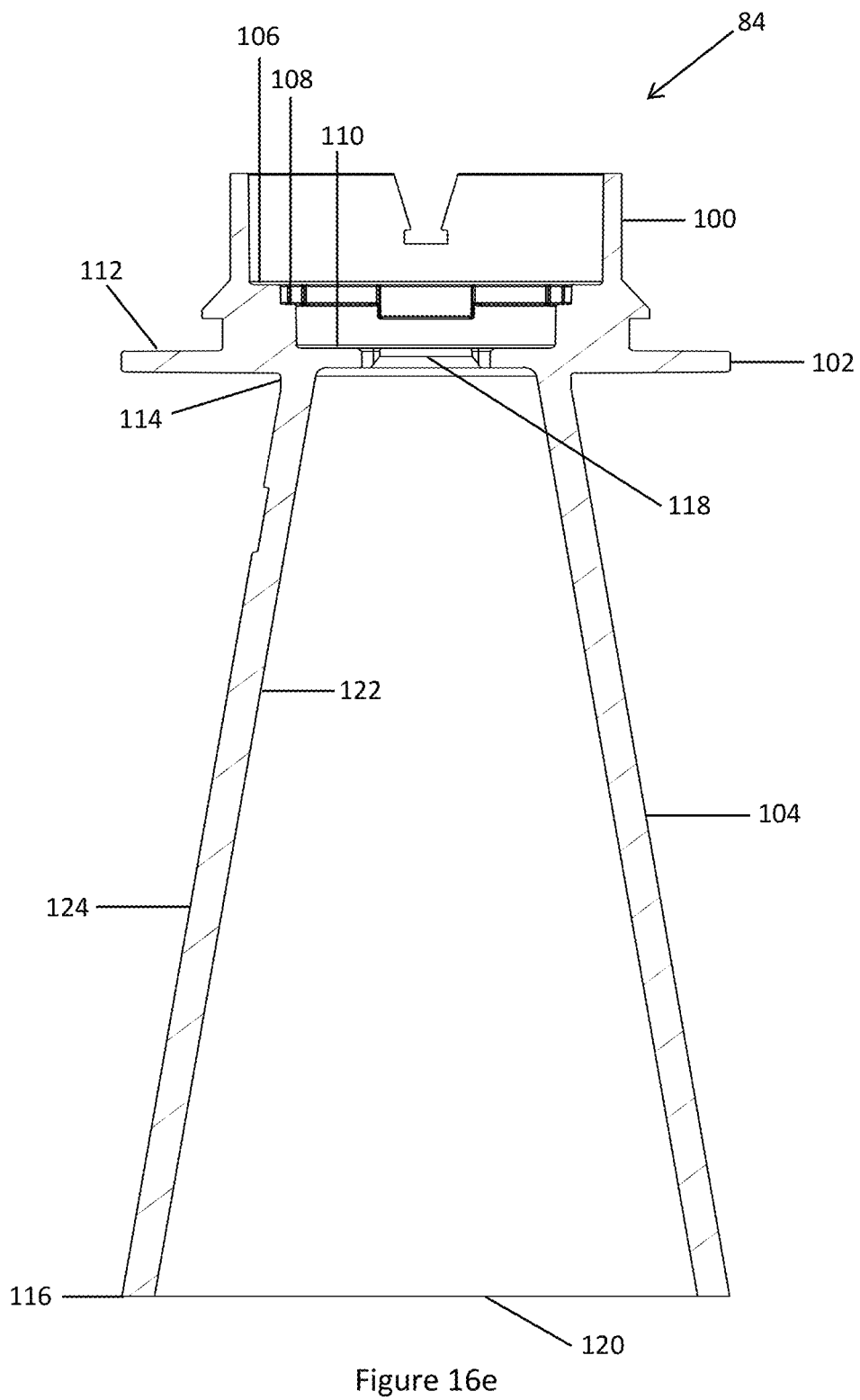

In the illustrated embodiments, the upper portion 100 of the lower housing 84 is generally cylindrical shaped. In the illustrated embodiments, the upper portion 100 of the lower housing 84 is operable to receive the lens 70, the grommet 90, the water level sensor 26, the lower O-ring 88, and the upper inner housing 82. In the illustrated embodiments, the upper portion 100 of the lower housing 84 is operable to be received in the upper outer housing 78. In the illustrated embodiments, as best shown in FIG. 16e, the upper portion 100 of the lower housing 84 includes an upper internal shoulder 106, a middle internal shoulder 108, and a lower internal shoulder 110. In the illustrated embodiments, the lower O-ring 88 is operable to seat against the upper internal shoulder 106, and the lens 70 and the grommet 90 are operable to seat against the lower internal shoulder 110. In the illustrated embodiments, the PCB 68 (with the water level sensor 26 mounted thereon) is operable to be seated between the lower O-ring 88 and the grommet 90.

In the illustrated embodiments, the flange 102 extends outwardly between the upper portion 100 and the lower portion 104 of the lower housing 84. In the illustrated embodiments, the upper outer housing 78 is operable to be mounted above an upper surface 112 of the flange 102.

In the illustrated embodiments, the lower portion 104 of the lower housing 84 has an upper end 114 and a lower end 116. In the illustrated embodiments, the upper end 114 of the lower portion 104 includes an upper opening 118, and the lower end 116 of the lower portion 104 includes a lower opening 120. In the illustrated embodiments, the upper opening 118 is smaller than the lower opening 120. In the illustrated embodiments, the lower portion 104 of the lower housing 84 has an inner surface 122 and an outer surface 124. In exemplary embodiments, the inner surface 122 of the lower portion 104 tapers outwardly from the upper end 114 to the lower end 116. In exemplary embodiments, the taper of the inner surface 122 of the lower portion 104 is constant.

In the illustrated embodiments, the lower portion 104 of the lower housing 84 is generally frustoconical shaped. In an exemplary embodiment, an opening angle of the lower portion 104 of the lower housing 84 is between approximately one degree (1°) and twenty-five degrees (25°), inclusive. In an exemplary embodiment, the opening angle of the lower portion 104 of the lower housing 84 is between approximately five degrees (5°) and twenty degrees (20°), inclusive. In an exemplary embodiment, the opening angle of the lower portion 104 of the lower housing 84 is between approximately ten degrees (10°) and twenty degrees (20°), inclusive. In an exemplary embodiment, the opening angle of the lower portion 104 of the lower housing 84 is between approximately twelve degrees (12°) and eighteen degrees (18°), inclusive. In an exemplary embodiment, the opening angle of the lower portion 104 of the lower housing 84 is approximately ten degrees (10°). In an exemplary embodiment, the opening angle of the lower portion 104 of the lower housing 84 is approximately fifteen degrees (15°).

In an exemplary embodiment, the lower portion 104 of the lower housing 84 intersects at least one of the transmitter exclusion zone 96 and the receiver exclusion zone 98. In an exemplary embodiment, the inner surface 122 of the lower portion 104 of the lower housing 84 intersects at least one of the transmitter exclusion zone 96 and the receiver exclusion zone 98. In an exemplary embodiment, the lower portion 104 of the lower housing 84 intersects both of the transmitter exclusion zone 96 and the receiver exclusion zone 98. In an exemplary embodiment, the inner surface 122 of the lower portion 104 of the lower housing 84 intersects both of the transmitter exclusion zone 96 and the receiver exclusion zone 98.

In an exemplary embodiment, the lower portion 104 of the lower housing 84 is generally opaque. In an exemplary embodiment, the inner surface 122 of the lower portion 104 of the lower housing 84 is generally opaque. In an exemplary embodiment, the lower portion 104 of the lower housing 84 is generally black colored. In an exemplary embodiment, the inner surface 122 of the lower portion 104 of the lower housing 84 is generally black colored. In an exemplary embodiment, the lower housing 84 has a smooth finish. In an exemplary embodiment, the inner surface 122 of the lower housing 84 has a smooth finish.

In an exemplary embodiment, for infrared ("IR") light, a light reflectance value ("LRV") of the lower portion 104 of the lower housing 84 is generally low. In an exemplary embodiment, for IR light, the LRV of the inner surface 122 of the lower portion 104 of the lower housing 84 is generally low. In an exemplary embodiment, for IR light, the LRV of the lower portion 104 of the lower housing 84 is less than approximately fifty percent (50%). In an exemplary embodiment, for IR light, the LRV of the inner surface 122 of the lower portion 104 of the lower housing 84 is less than approximately fifty percent (50%). In an exemplary embodiment, for IR light, the LRV of the lower portion 104 of the lower housing 84 is less than approximately forty percent (40%). In an exemplary embodiment, for IR light, the LRV of the inner surface 122 of the lower portion 104 of the lower housing 84 is less than approximately forty percent (40%). In an exemplary embodiment, for IR light, the LRV of the lower portion 104 of the lower housing 84 is less than approximately thirty percent (30%). In an exemplary embodiment, for IR light, the LRV of the inner surface 122 of the lower portion 104 of the lower housing 84 is less than approximately thirty percent (30%). As used herein, infrared or IR light refers to light having a wavelength in the range between approximately seven-hundred nanometers (700 nm) and one-thousand nanometers (1000 nm), inclusive.

In an exemplary embodiment, the lower housing 84 is approximately three inches (3 in.) in length. However, one of ordinary skill in the art will appreciate that the lower housing 84 could be shorter or longer. In another exemplary embodiment, the lower housing 84 is approximately two inches (2 in.) in length. In another exemplary embodiment, the lower housing 84 is approximately one inch (1 in.) in length.

In an exemplary embodiment, the lower housing 84 is made from a plastic. In an exemplary embodiment, the lower housing 84 is made from nylon 12.

The following includes definitions of exemplary terms that may be used throughout the disclosure. Both singular and plural forms of all terms fall within each meaning.

"Computer" or "processor," as used herein includes, but is not limited to, one or more programmed or programmable electronic device or coordinated devices that can store, retrieve, or process data and may be any processing unit, distributed processing configuration, or processor systems. Examples of processor include microprocessors, microcontrollers, central processing units (CPUs), graphics processing units (GPUs), tensor processing unit (TPU), floating point units (FPUs), reduced instruction set computing (RISC) processors, digital signal processors (DSPs), field programmable gate arrays (FPGAs), etc., in any combination. One or more cores of a single microprocessor and/or multiple microprocessor each having one or more cores can be used to perform the operation as being executed by a processor herein. The processor can also be a processor dedicated to the training of neural networks and other artificial intelligence (AI) systems. The processor may be associated with various other circuits that support operation in the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or drawings.

"Network interface," synonymous with "data interface," as used herein includes, but is not limited to, any interface or protocol for transmitting and receiving data between electronic devices. The network or data interface can refer to a connection to a computer via a local network or through the internet and can also refer to a connection to a portable device—e.g., a mobile device or a USB thumb drive—via a wired or wireless connection. A network interface can be used to form networks of computers to facilitate distributed and/or remote computing (i.e., cloud-based computing). "Cloud-based computing" means computing that is implemented on a network of computing devices that are remotely connected to the device via a network interface.

"Signal," as used herein includes, but is not limited to, one or more electric signals, including analog or digital signals, one or more computer instructions, a bit or bit stream, or the like.

"Logic," synonymous with "circuit," as used herein includes but is not limited to hardware, firmware, software and/or combinations of each to perform a function(s) or action(s). For example, based on a desired application or needs, logic may include a software-controlled microprocessor, discrete logic such as an application specific integrated circuit (ASIC), or other programmed logic device and/or controller. Logic may also be fully embodied as software. The logic flow of an embodiment of the invention could be embodied in logic.

"Software," as used herein includes, but is not limited to, one or more computer readable and/or executable instructions that cause a computer, processor, logic, and/or other electronic device to perform functions, actions, and/or behave in a desired manner. The instruments may be embodied in various forms such as routines, algorithms, modules, or programs including separate applications or code from dynamically linked sources or libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. The logic flow of an embodiment of the invention could be embodied in software.

"Module" or "engine" as used herein will be appreciated as comprising various configurations of computer hardware and/or software implemented to perform operations. In some embodiments, modules or engines as described herein may be represented as instructions operable to be executed by a processor in a processor or memory. In other embodiments, modules or engines as described herein may be represented as instructions read or executed from readable media. A module or engine may operate in either hardware or software according to application specific parameters or user settings. It will be appreciated by those of skill in the art that such configurations of hardware and software may vary, but remain operable in substantially similar ways. The logic flow of an embodiment of the invention could be embodied in a module or engine.

"Data storage device," as used herein includes, but is not limited to, a device or devices for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk; and other media, e.g., ROM, PROM, EPROM, EEPROM, flash PROM, external memory drives, etc. The memory of an embodiment of the invention could be embodied in a data storage device.

While the above exemplary definitions have been provided, it is intended that the broadest reasonable interpretation consistent with this specification be used for these and other terms. Aspects and implementations of the present disclosure will be understood more fully from the detailed description given above and from the accompanying drawings of the various aspects and implementations of the disclosure. This should not be taken to limit the disclosure to the specific aspects or implementations, but is for explanation and understanding only.

One of ordinary skill in the art will now appreciate that the present invention provides a sump pump system, including a water level sensor shield. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A water level sensor assembly for a sump pump system comprising:
   a water level sensor, the water level sensor operable to detect a level of water in a sump, the water level sensor including a transmitter and a receiver, the transmitter operable to emit light, the receiver operable to receive light, the transmitter having a transmitter exclusion zone extending from the transmitter, the receiver having a receiver exclusion zone extending from the receiver; and
   a housing, the housing including an upper portion and a lower portion, the upper portion operable to receive the water level sensor, the lower portion having an upper end and a lower end, the upper end including an upper opening, the lower end including a lower opening, the upper opening being smaller than the lower opening.

2. The water level sensor assembly of claim 1, wherein:
   the lower portion of the housing has an inner surface; and
   the inner surface tapers outwardly from the upper end to the lower end.

3. The water level sensor assembly of claim 1, wherein:
   the lower portion of the housing is generally frustoconical shaped; and
   an opening angle of the lower portion is between approximately one degree and twenty-five degrees, inclusive.

4. The water level sensor assembly of claim 1, wherein:
   the lower portion of the housing is generally frustoconical shaped; and
   an opening angle of the lower portion is between approximately five degrees and twenty degrees, inclusive.

5. The water level sensor assembly of claim 1, wherein:
   the lower portion of the housing is generally frustoconical shaped; and
   an opening angle of the lower portion is between approximately ten degrees and twenty degrees, inclusive.

6. A water level sensor assembly for a sump pump system comprising:
   a water level sensor, the water level sensor operable to detect a level of water in a sump, the water level sensor including a transmitter and a receiver, the transmitter operable to emit light, the receiver operable to receive light, the transmitter having a transmitter exclusion zone extending from the transmitter, the receiver having a receiver exclusion zone extending from the receiver; and
   a housing, the housing including an upper portion and a lower portion, the upper portion operable to receive the water level sensor, a seal, and a lens, the lower portion having an upper end and a lower end, the upper end including an upper opening, the lower end including a lower opening, the upper opening being smaller than the lower opening, the seal being operable to seat against the upper end of the lower portion.

7. The water level sensor assembly of claim 6, wherein:
   the lower portion of the housing has an inner surface; and
   the inner surface tapers outwardly from the upper end to the lower end.

8. The water level sensor assembly of claim 6, wherein:
   the lower portion of the housing is generally frustoconical shaped; and
   an opening angle of the lower portion is between approximately one degree and twenty-five degrees, inclusive.

9. The water level sensor assembly of claim 6, wherein:
   the lower portion of the housing is generally frustoconical shaped; and
   an opening angle of the lower portion is between approximately five degrees and twenty degrees, inclusive.

10. The water level sensor assembly of claim 6, wherein:
    the lower portion of the housing is generally frustoconical shaped; and
    an opening angle of the lower portion is between approximately ten degrees and twenty degrees, inclusive.

11. A water level sensor assembly for a sump pump system comprising:
    a water level sensor, the water level sensor operable to detect a level of water in a sump, the water level sensor including a transmitter and a receiver, the transmitter operable to emit light, the receiver operable to receive light, the transmitter having a transmitter exclusion zone extending from the transmitter, the receiver having a receiver exclusion zone extending from the receiver; and
    a housing, the housing including an upper portion and a lower portion, the upper portion operable to receive the water level sensor, the lower portion having an upper end and a lower end, the upper end including an upper opening, the lower end including a lower opening, the upper opening being smaller than the lower opening, the lower portion having an inner surface;
    wherein the inner surface of the lower portion of the housing intersects at least one of the transmitter exclusion zone and the receiver exclusion zone.

12. The water level sensor assembly of claim 11, wherein:
    the inner surface of the lower portion of the housing intersects both of the transmitter exclusion zone and the receiver exclusion zone.

13. The water level sensor assembly of claim 11, wherein:
    the inner surface of the lower portion of the housing tapers outwardly from the upper end to the lower end.

14. The water level sensor assembly of claim 11, wherein:
    the lower portion of the housing is generally frustoconical shaped; and
    an opening angle of the lower portion is between approximately one degree and twenty-five degrees, inclusive.

15. The water level sensor assembly of claim 11, wherein:
    the lower portion of the housing is generally frustoconical shaped; and
    an opening angle of the lower portion is between approximately five degrees and twenty degrees, inclusive.

16. The water level sensor assembly of claim 11, wherein:
    the lower portion of the housing is generally frustoconical shaped; and
    an opening angle of the lower portion is between approximately ten degrees and twenty degrees, inclusive.

17. The water level sensor assembly of claim 11, wherein:
    the inner surface of the lower portion of the housing is generally opaque.

18. The water level sensor assembly of claim 11, wherein:
    the inner surface of the lower portion of the housing is generally black colored.

19. The water level sensor assembly of claim 11, wherein:
the inner surface of the lower portion of the housing has a smooth finish.

20. The water level sensor assembly of claim 11, wherein:
a light reflectance value of the inner surface of the lower portion of the housing is less than approximately fifty percent.

\* \* \* \* \*